May 20, 1958 W. B. EDDISON ET AL 2,835,088
MACHINE FOR APPLYING TUBULAR BANDS TO BOTTLE TOPS AND THE LIKE
Filed March 15, 1954 16 Sheets-Sheet 2
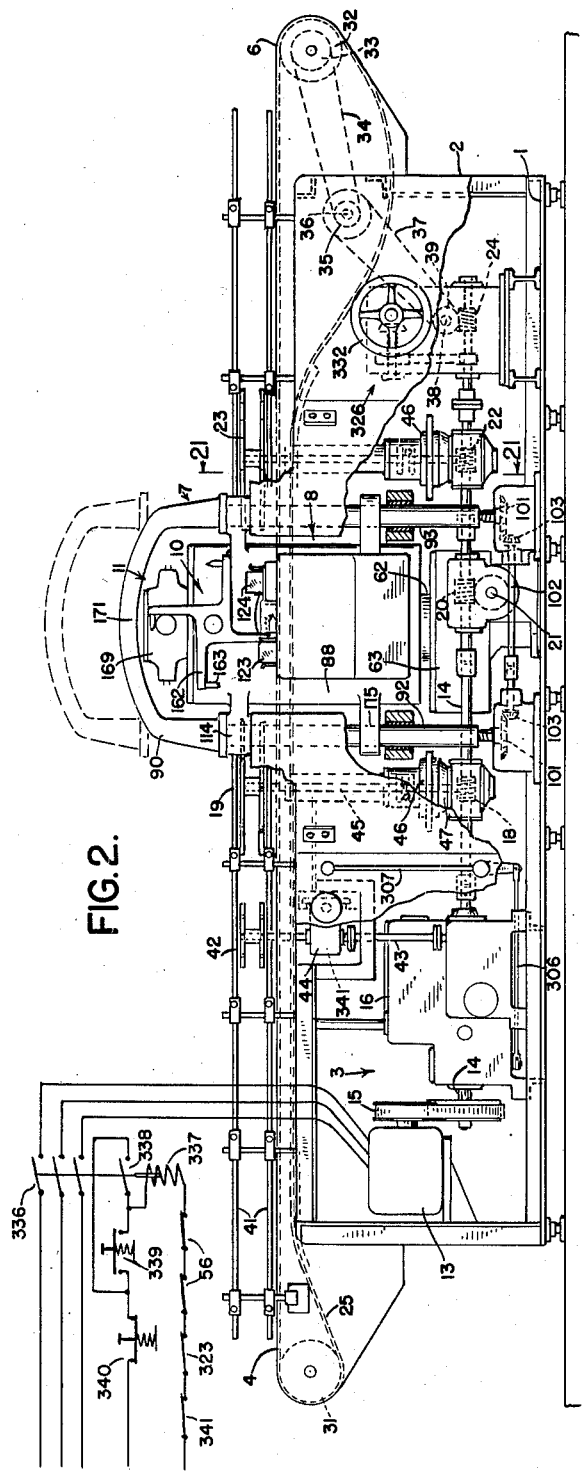
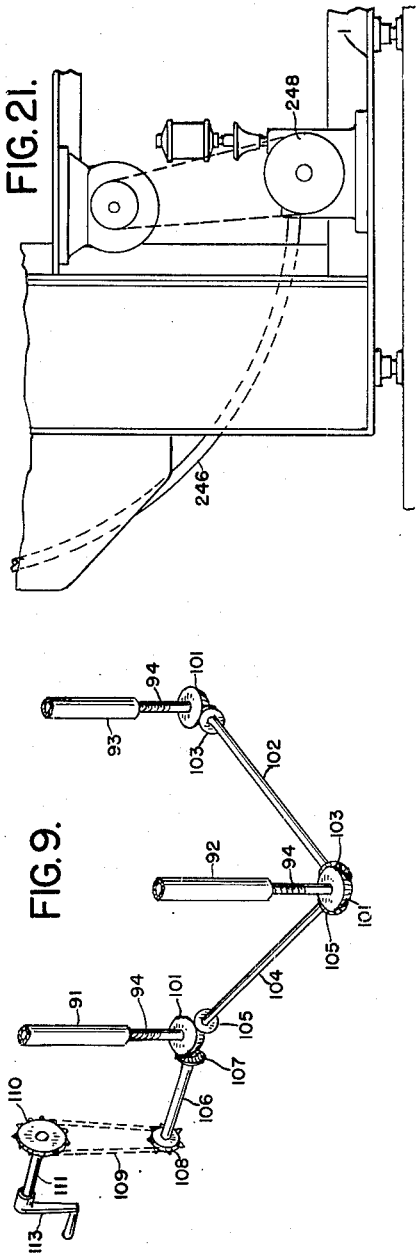
INVENTORS:
WILLIAM BARTON EDDISON
WARREN E. ERICKSON
BY
Andrus & Scealer
Attorneys

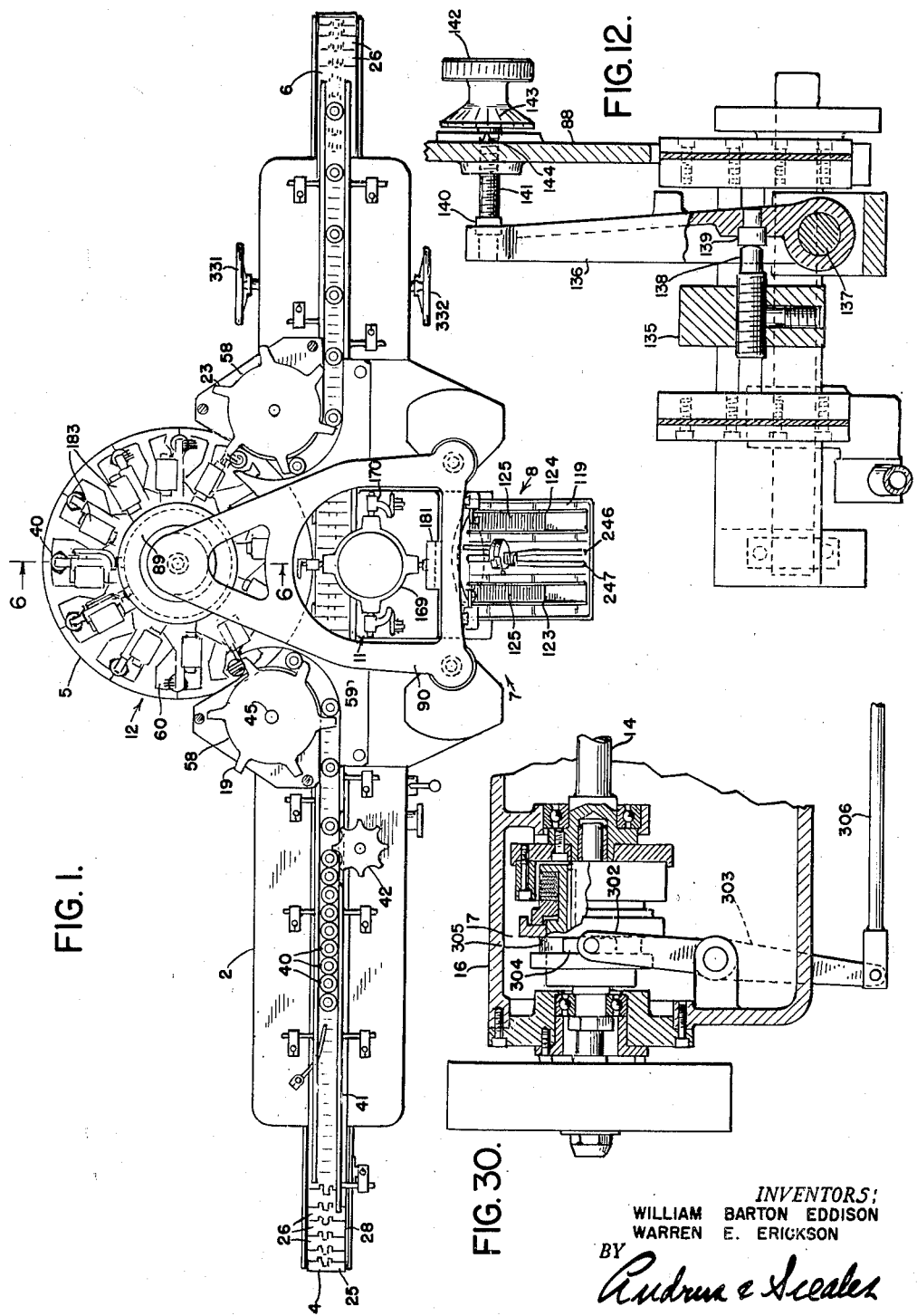

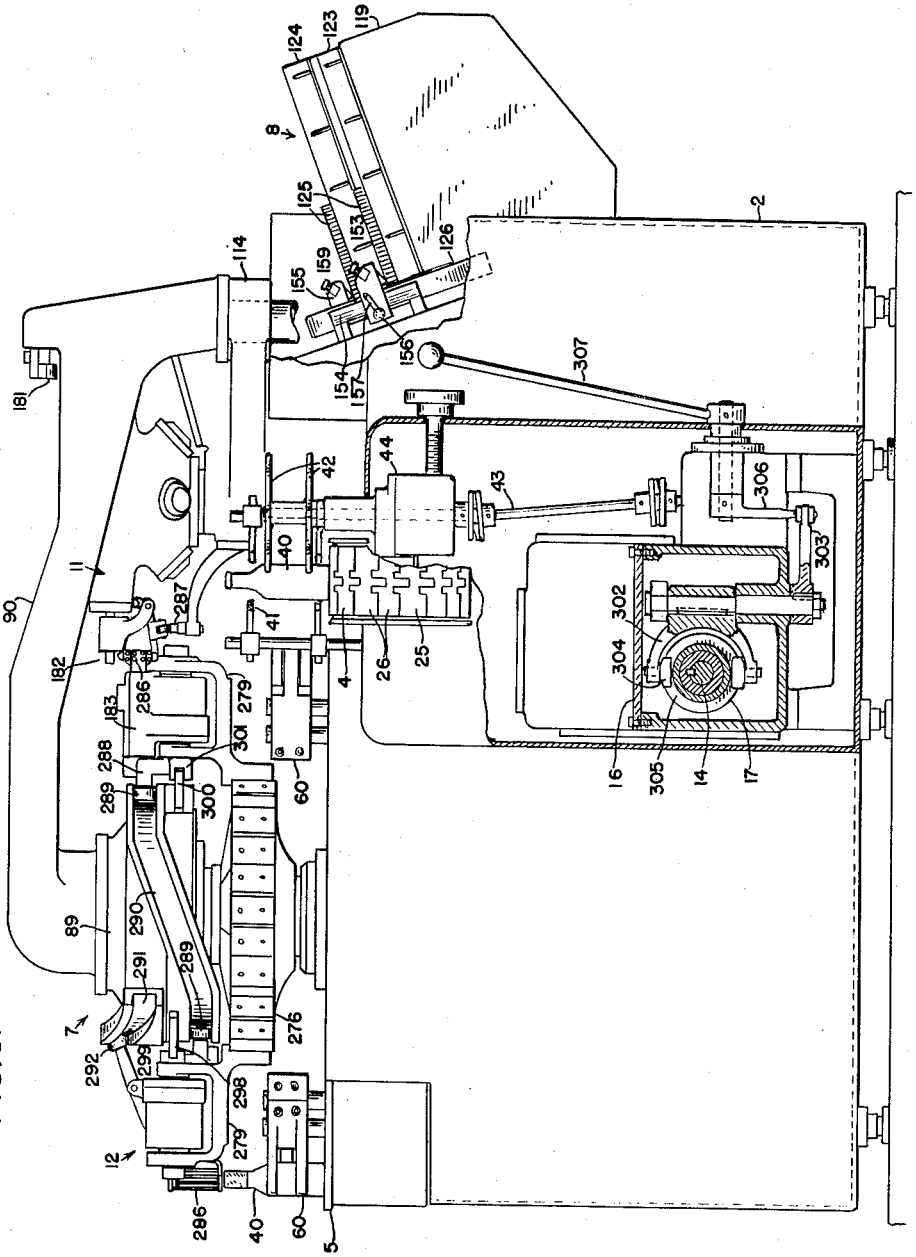

May 20, 1958     W. B. EDDISON ET AL     2,835,088
MACHINE FOR APPLYING TUBULAR BANDS TO BOTTLE TOPS AND THE LIKE
Filed March 15, 1954     16 Sheets-Sheet 4

*INVENTORS:*
WILLIAM BARTON EDDISON
WARREN E. ERICKSON
BY
*Attorneys*

May 20, 1958 W. B. EDDISON ET AL 2,835,088
MACHINE FOR APPLYING TUBULAR BANDS TO BOTTLE TOPS AND THE LIKE
Filed March 15, 1954 16 Sheets-Sheet 6

INVENTORS:
WILLIAM BARTON EDDISON
WARREN E. ERICKSON
BY
Attorneys

May 20, 1958 W. B. EDDISON ET AL 2,835,088
MACHINE FOR APPLYING TUBULAR BANDS TO BOTTLE TOPS AND THE LIKE
Filed March 15, 1954 16 Sheets-Sheet 7

INVENTORS:
WILLIAM BARTON EDDISON
WARREN E. ERICKSON
BY
Attorneys

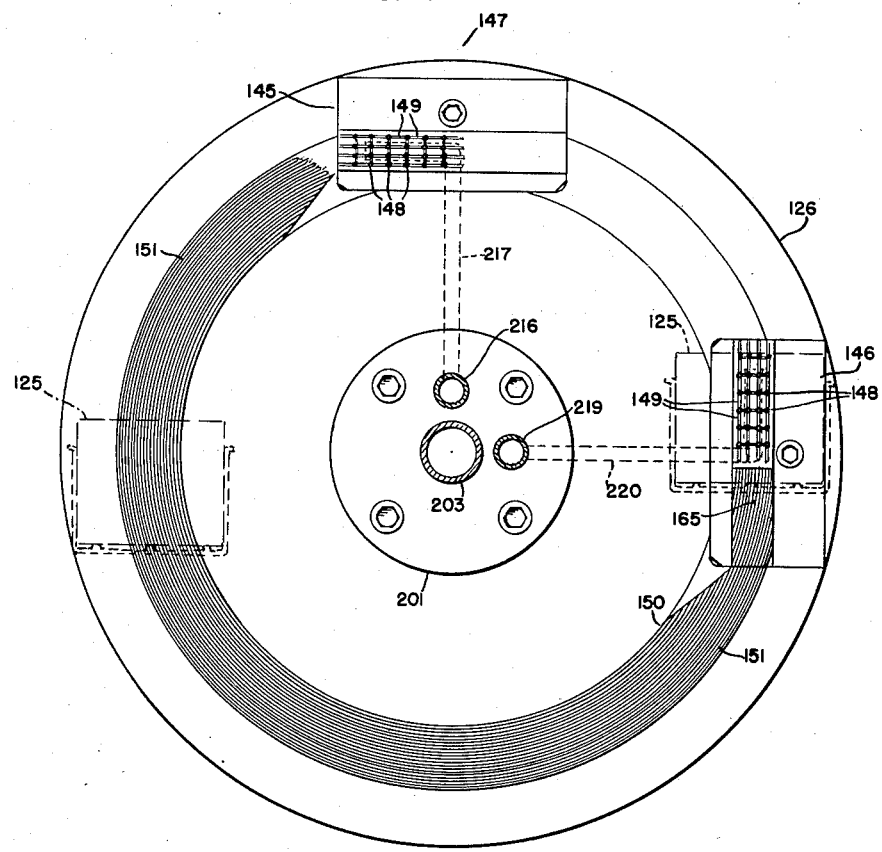

May 20, 1958 W. B. EDDISON ET AL 2,835,088
MACHINE FOR APPLYING TUBULAR BANDS TO BOTTLE TOPS AND THE LIKE
Filed March 15, 1954 16 Sheets-Sheet 9

INVENTORS:
WILLIAM BARTON EDDISON
WARREN E. ERICKSON
BY
Andrus & Sceales
Attorneys May 20, 1958  W. B. EDDISON ET AL  2,835,088
MACHINE FOR APPLYING TUBULAR BANDS TO BOTTLE TOPS AND THE LIKE
Filed March 15, 1954  16 Sheets-Sheet 11

*INVENTORS:*
WILLIAM BARTON EDDISON
WARREN E. ERICKSON
BY
Andrus & Sceales
Attorneys May 20, 1958   W. B. EDDISON ET AL   2,835,088
MACHINE FOR APPLYING TUBULAR BANDS TO BOTTLE TOPS AND THE LIKE
Filed March 15, 1954   16 Sheets-Sheet 12

INVENTORS:
WILLIAM BARTON EDDISON
WARREN E. ERICKSON
BY
Andrus & Scales
Attorneys May 20, 1958  W. B. EDDISON ET AL  2,835,088
MACHINE FOR APPLYING TUBULAR BANDS TO BOTTLE TOPS AND THE LIKE
Filed March 15, 1954  16 Sheets-Sheet 14

INVENTORS:
WILLIAM BARTON EDDISON
WARREN E. ERICKSON
BY
Andrus & Sceales
Attorneys May 20, 1958 W. B. EDDISON ET AL 2,835,088
MACHINE FOR APPLYING TUBULAR BANDS TO BOTTLE TOPS AND THE LIKE
Filed March 15, 1954 16 Sheets-Sheet 15

INVENTORS:
WILLIAM BARTON EDDISON
WARREN E. ERICKSON
BY
Attorneys

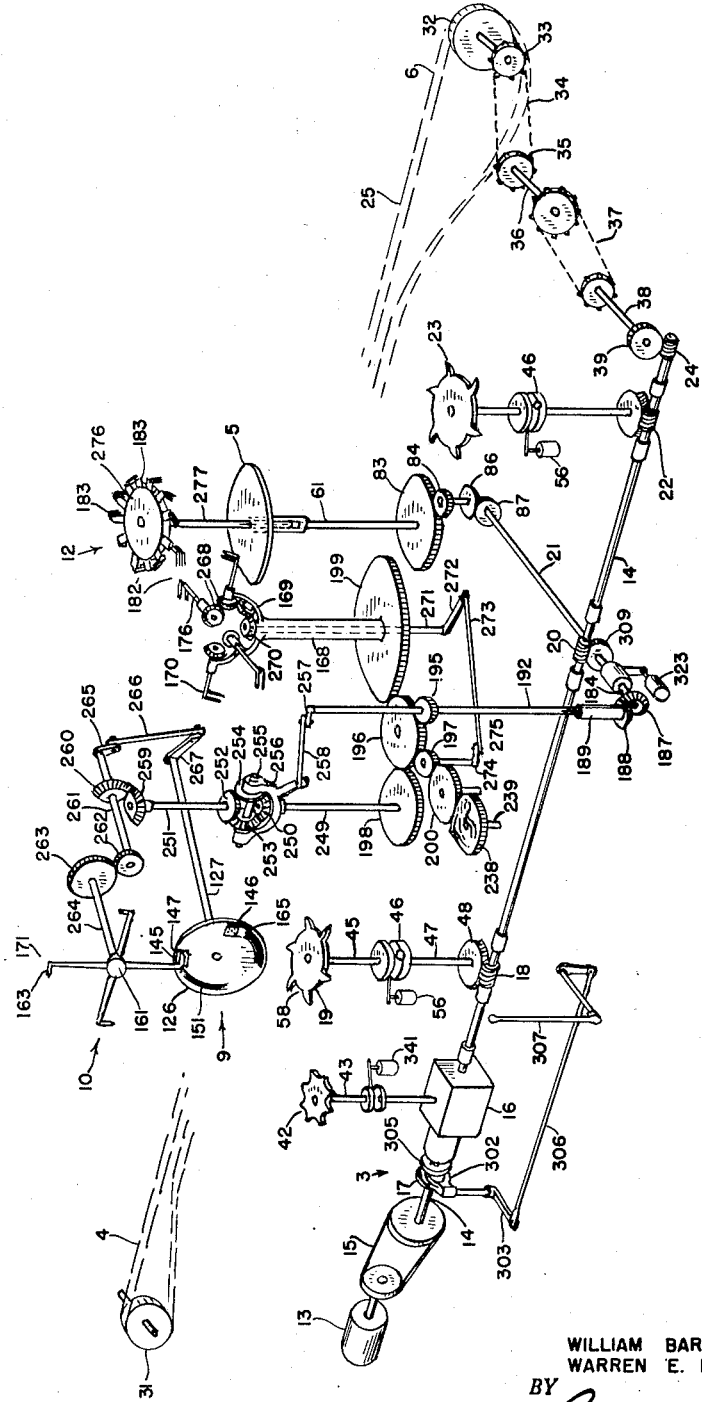

United States Patent Office 2,835,088
Patented May 20, 1958

2,835,088

MACHINE FOR APPLYING TUBULAR BANDS TO BOTTLE TOPS AND THE LIKE

William Barton Eddison, Ardsley-on-Hudson, N. Y., and Warren E. Erickson, Madison, Wis., assignors to Gisholt Machine Company, Madison, Wis., a corporation of Wisconsin Application March 15, 1954, Serial No. 416,184

30 Claims. (Cl. 53—77)

This invention relates to machines for applying tubular bands to bottle tops and the like, as in the application of regenerated cellulose shrink fit cut sealing bands over the top of capped bottles.

While several different types of machines have been constructed and tried for the purpose, so far as is known no such machine, prior to the present invention, has found commercial acceptance. Instead, such cut sealing bands are still being applied manually to bottle tops.

The failure of prior machines has generally resulted from a failure to meet certain requirements arising from the following facts: (1) the sealing bands are of different sizes and have a wide dimensional variation and tolerance, (2) the bottle lines coming from filling and capping machines generally have a speed of from 120 to over 200 bottles per minute and are adapted to carry bottles of many different shapes and sizes and of a wide dimensional tolerance, (3) where government stamps are applied over the caps the machines for doing so often leave the stamp irregularly applied making it difficult to apply the sealing band thereover, (4) the seals must be maintained fresh due to rapid shrinking characteristics and must not be left in the machine for any substantial time, (5) the seals are generally wet and readily gum up parts of the machine when they come in contact therewith, (6) the machine must not be susceptible to inaccuracies arising from wear or from inherent design, (7) the loading and care of the machine must be convenient for a single operator without fatigue, and (8) the bottle lines travel at table level and any machine should be adaptable for applying the seals to bottles of different height at that level and for loading of seals at the same level.

The machine of the present invention has found commercial acceptance and has met the requirements arising from the facts outlined above. It utilizes the general principles set forth in the following copending applications: Serial No. 270,838, filed February 9, 1952, by Warren E. Erickson, one of the present inventors, for Seal Stripping and Opening Device, now Patent No. 2,747,769; Serial No. 403,332, filed January 11, 1954, by the present inventors for Magazine Feed, now Patent No. 2,794,336; Serial No. 407,846, filed February 3, 1954, by William Barton Eddison, one of the present inventors, for Seal Opening and Transferring Mechanism; Serial No. 408,758, filed February 8, 1954, by Warren E. Erickson, for Magnetic Seal Clamp, now Patent No. 2,752,030; Serial No. 410,008, filed February 12, 1954, by William Barton Eddison, for Seal Transferring Apparatus; Serial No. 410,194, filed February 15, 1954, by Willam Barton Eddison, for Seal Opening and Applying Head.

In carrying out the invention the machine embodies substantial improvements upon the structures of several of the applications identified above, and in addition provides a relationship of the several parts whereby a single drive is employed with numerous safety clutches and provision for adjustment to meet the requirements of different size seals. Parts of the machine are adapted to be elevated for accommodating bottles of different sizes.

The several stripping and transfer units are disposed to employ a tilt magazine as set forth in application Serial No. 403,332, referred to above, and at the same time provide for vertical positioning of the sealing bands as they are applied to bottle tops.

The present invention provides a complete machine adapted to apply seals to bottle tops at a rate of the order referred to above and with but a single operator as against former manual application of seals which required from four to six additional workers.

In the drawings:

Figure 1 is a top plan view of the machine with the cover guard removed;

Fig. 2 is a front elevation of the machine;

Fig. 3 is a left end view of the machine;

Fig. 4 is a detail vertical transverse section partly in elevation and showing one of the pocket wheels and its safety clutch;

Fig. 5 is an enlarged detail elevation of the safety clutch of Fig. 4;

Fig. 9 is a schematic plan view of the arrangement and drive for the jacks;

Fig. 11 is an enlarged face view of the stripper disc with parts broken away and sectioned;

Fig. 12 is a detail horizontal section showing the stripper disc adjustment;

Fig. 15 is a diagrammatic top plan view showing the relative axial relations of the stripper disc, spear mechanism and transfer mechanism;

Fig. 16 is a top plan view of a two finger head;

Fig. 17 is a side elevation of the head of Fig. 16;

Fig. 18 is an outer end elevation of the head of Fig. 16;

Fig. 20 is a detail top plan view showing the valve control cam;

Fig. 21 is a transverse vertical detail section taken on line 21—21 of Fig. 2 and showing the vacuum pump;

Fig. 30 is a horizontal section showing the manual main drive clutch;

Fig. 35 is a diagrammatic illustration of the drive mechanism for the machine.

Figure 6:
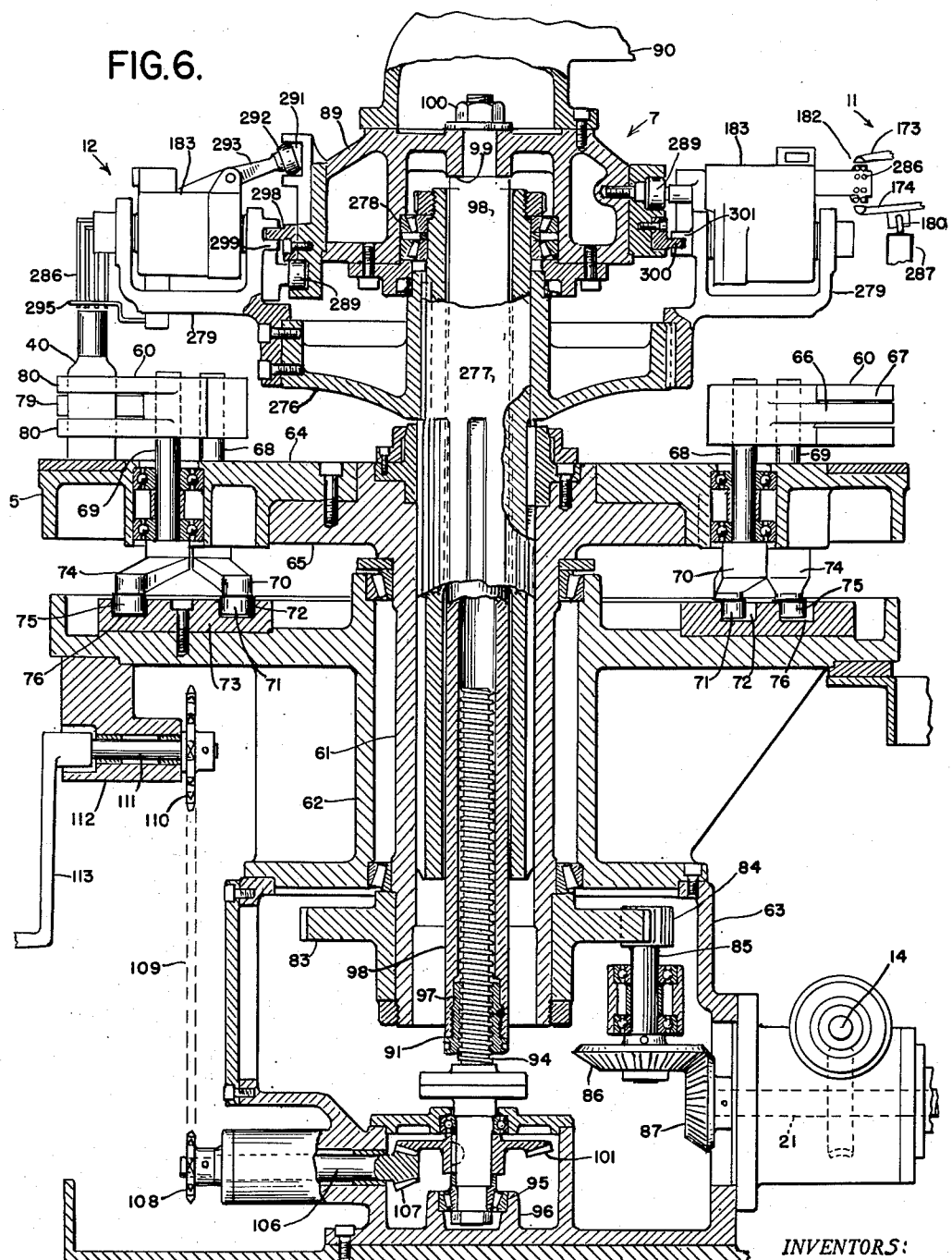
Fig. 6 is an enlarged section taken vertically on line 6—6 of Fig. 1 and showing the rear table construction.

The machine illustrated in the drawings comprises a fixed base 1 having a housing 2 containing the drive mechanism 3, an intake conveyor 4 for bottles, a circular table 5 for carrying the bottles in indexed position for application of seals thereto, and an outgoing discharge conveyor 6 for the bottles. The machine further comprises a vertically movable frame 7 which carries a magazine assembly 8 at the front of the machine, a stripper mechanism 9, a spearing mechanism 10, a two finger head transfer mechanism 11, and an eight finger head seal applying mechanism 12.

The drive mechanism 3 comprises an electric motor 13 carried by base 1 in housing 2 beneath the intake conveyor 4 and a main drive shaft 14 extending generally longitudinally of the machine parallel to conveyors 4 and 6 and which is driven from motor 13 by means of a belt 15 and suitable pulleys.

The main drive shaft 14 is actually made up of a plurality of axially aligned short shaft sections universally coupled end to end and mounted in individual bearings in base 1. The first section of shaft 14 extends from the driven pulley for belt 15 into a metering gear box 16 in base 1 where it carries the axially movable drive member of a main clutch 17 that is splined thereto and connects the same to the second section of shaft 14 extending through the opposite end of gear box 16.

The fourth section of shaft 14 carries a worm gear 18 for driving an intake pocket wheel 19 adjacent circular table 5.

The sixth section of shaft 14 carries a worm gear 20 for driving the main cross shaft 21 that in turn drives the circular table 5 and mechanism 9, 10, 11 and 12.

The eighth section of shaft 14 carries a worm gear 22 for driving the outgoing pocket wheel 23 adjacent table 5.

The ninth and end section of shaft 14 carries a worm gear 24 for driving the conveyors 4 and 6.

The conveyors 4 and 6 comprise a single endless chain 25 consisting of adjacent links in the form of transverse slats 26 interlocked and hinged together in succession to form the chain. The slats 26 are adapted to ride upon a pair of spaced parallel side rails 27 and 28 disposed horizontally in a straight path through the machine with the upper chain course at the level of table 5, and the lower return path beneath the same and supported on a similar pair of spaced parallel rails 29 and 30.

The conveyor chain 25 is supported at its opposite ends by large free rolling sprockets 31 and 32 which reverse the chain between its upper and lower course. The sprocket 32 at the discharge end of the chain 25 serves as the chain drive sprocket pulling the upper course of the chain toward it.

For this purpose the chain drive sprocket 32 has a chain sprocket 33 secured on its axle and which in turn is driven by a chain 34 from a sprocket 35 on a transverse counter shaft 36 beneath conveyor 6. Counter shaft 36 is in turn driven by a chain 37 and suitable sprockets from a shaft 38 crossing the last section of main drive shaft 14. Shaft 38 is in turn driven by gear 39 thereon meshing with worm 24 on shaft 14.

The bottles 40 are supported and carried along into the machine on the conveyor end 4 of chain 25 and out of the machine on the conveyor end 6 of chain 25. The bottles are retained on the chain 25 against lateral displacement therefrom by means of suitable vertically adjustable horizontal side rails 41 extending along the upper course of the conveyors 4 and 6. Side rails 41 are also adjustable toward and away from each other to guide bottles of different sizes.

The bottles 40 are metered by a metering wheel 42 disposed horizontally on a vertical shaft 43 carried by suitable bearings in a bearing block 44 which is adjustable laterally of the conveyor 4 to provide for the use of different size metering wheels to accommodate different size bottles. The shaft 43 is driven from suitable mechanism in the metering gear box 16. The metering construction is not shown in detail since any suitable metering drive may be employed, that preferred being described and claimed in a copending application Serial No. 416,174, filed by the present inventors on even date herewith. It is enough here to state that the metering wheel 42 serves to space the bottles 40 as they continue along conveyor 4 and enter the intake pocket wheel 19 which removes them from the conveyor and delivers them to circular table 5.

The pocket wheel 19 is carried by a vertical shaft 45 mounted in suitable bearings in base 1 and connected at its lower end by means of a safety overload clutch 46 to a vertical shaft 47 carrying a gear 48 meshing with worm 18.

The safety clutch 46 may be of any suitable construction, that shown in Figs. 4 and 5 comprising a driver plate 49 on the upper end of shaft 47 and having a plurality of circumferentially spaced recesses 50 in its upper surface for receiving a roller 51 carried by an arm 52 which is pivotally carried by clutch disc 53 keyed to shaft 45. A pivotally supported switch actuating lever 54 has one end riding upon the free end of arm 52 to be raised thereby upon stopping of shaft 45 from rotating whereby roller 51 is raised out of its recess 50. The opposite end of lever 54 presses downwardly upon the plunger 55 of one of two micro switches 56 which opens the holding circuit for the starting switch in the circuit of motor 13. When roller 51 drops into another recess 50 it again completes a driving connection from shaft 47 to shaft 45 and releases switch 56. The machine may then be restarted by the operator pushing the start button for motor 13.

A spring 57 disposed between clutch disc 53 and arm 52 applies a light pressure on the arm to normally retain roller 51 in one of the recesses 50 to thereby maintain the driving connection between shafts 45 and 47.

The pocket wheel 19 comprises a hub having a plurality of radially extending spokes or arms which define outwardly open bottle receiving pockets 58 therebetween.

A curved guide rail 59 retains the bottles 40 in corresponding pockets 58 as wheel 19 rotates away from conveyor 4 and until a rotary bottle clamping mechanism 60 on table 5 takes the bottle from the pocket.

The table 5 as shown in Fig. 6 is carried by a vertical hollow rotary spindle 61 mounted in suitable bearings in an upstanding pedestal 62 on gear box 63 carried by base 1. The table 5 is made up of a plurality of circumferential sectors 64 separately secured to a flange 65 at the upper end of spindle 61 and circumferentially spaced from each other.

Figure 7:
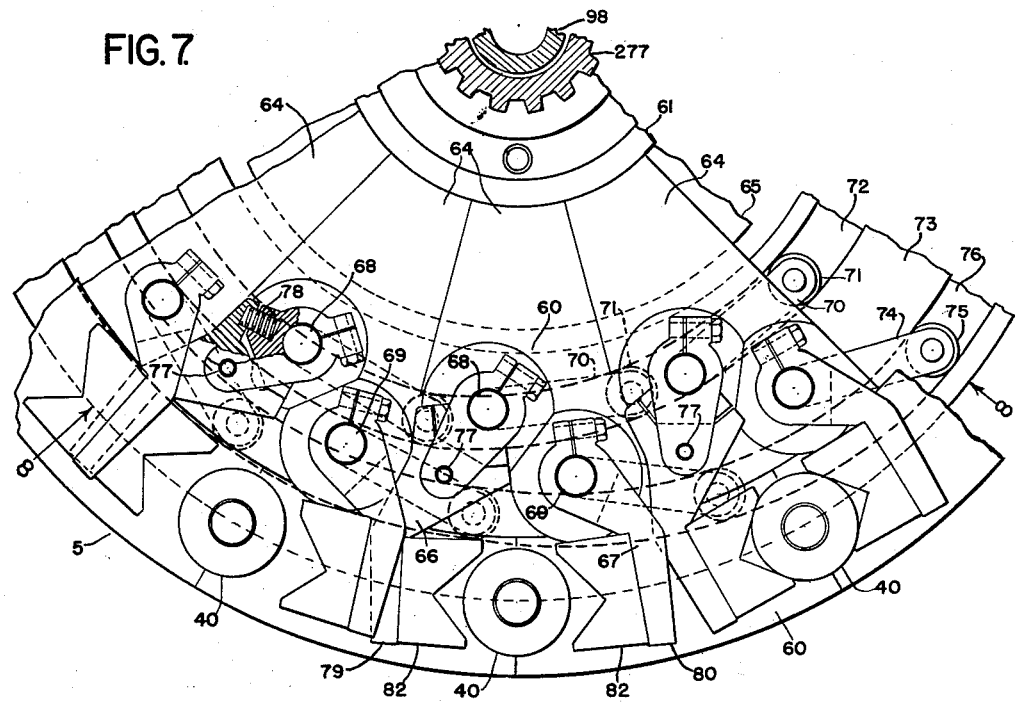
Fig. 7 is an enlarged detail plan view of the bottle clamps on a segment of the table.
Figure 8:
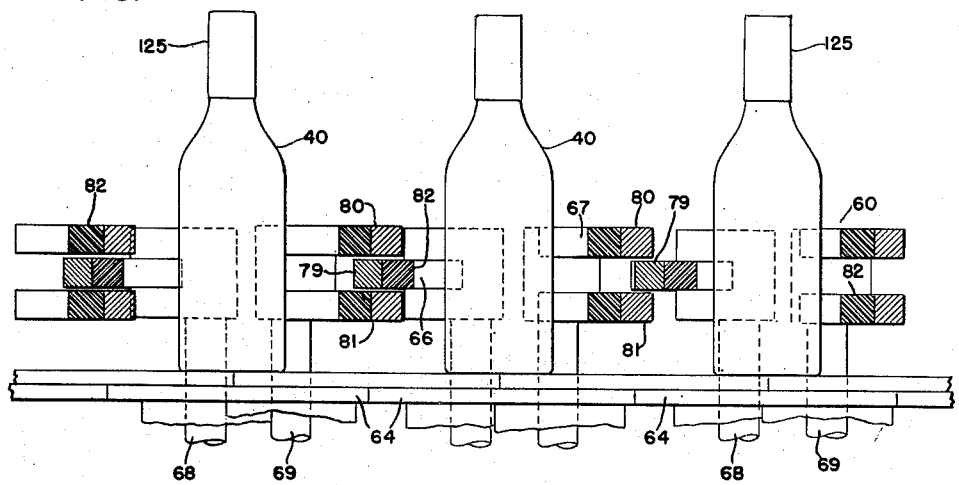
Fig. 8 is a developed section taken on curved line 8—8 of Fig. 7.
Figure 10:
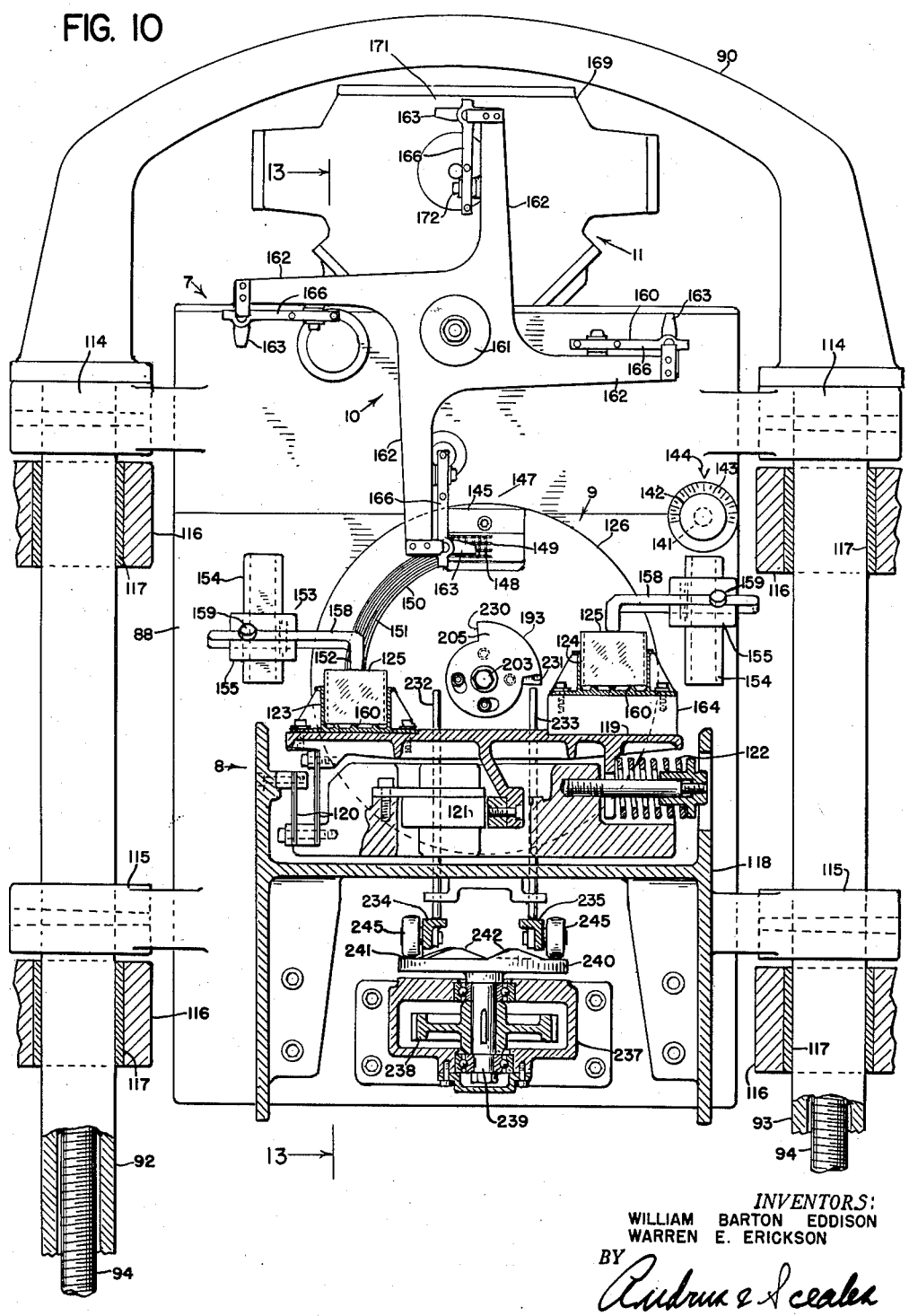
Fig. 10 is a front elevation of the seal handling mechanism with the magazines sectioned.
Figure 13:
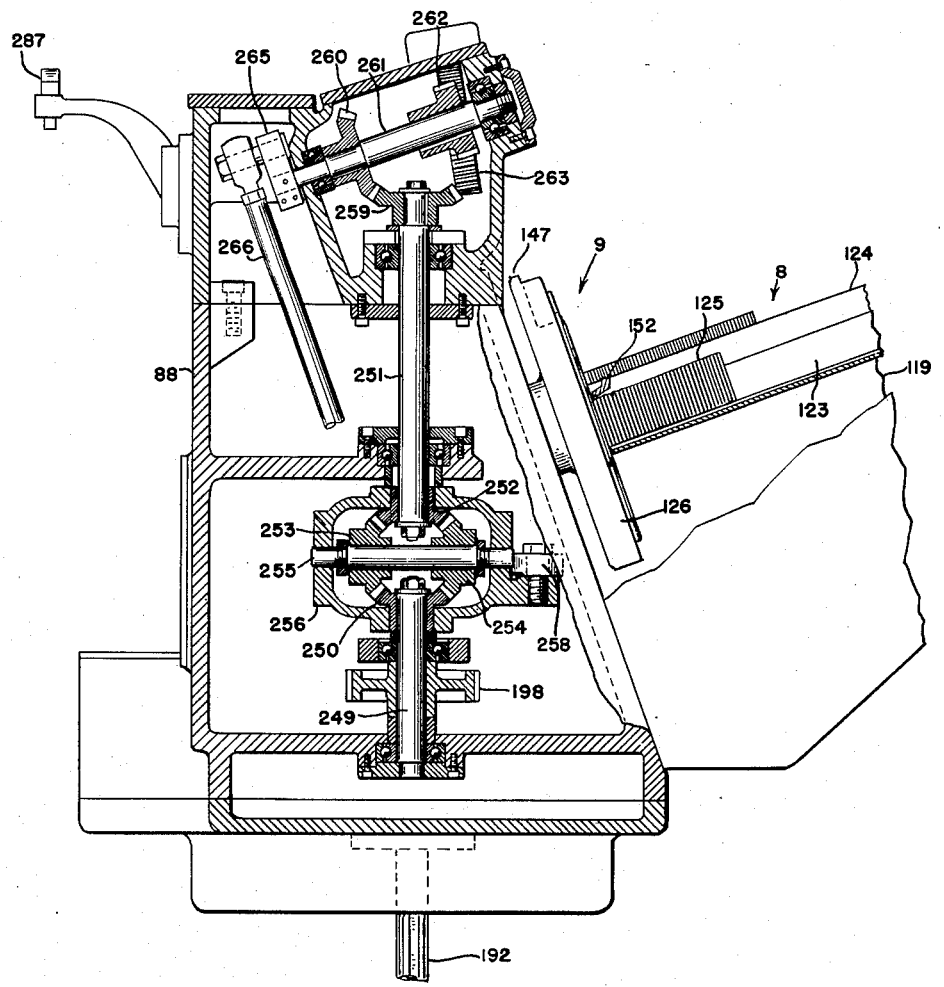
Fig. 13 is a vertical section of part of the drive for the seal handling mechanism taken on line 13—13 of Fig. 10.

Each sector 64 carries a bottle clamp 60 thereon as shown in Figs. 7 and 8, and comprising a pair of clamp arms 66 and 67 mounted on separate vertical clamp shafts 68 and 69, respectively, rotatable in suitable bearings in the corresponding table sector. The lower end of each shaft 68 and 69 extends downwardly through table 5.

A crank arm 70 is secured to the lower end of shaft 68 and carries at its outer end a cam follower 71 which is adapted to ride in a cam groove 72 in a stationary circular cam track assembly 73 mounted on the upper end of pedestal 62. Similarly, a crank arm 74 is secured to the lower end of shaft 69 and carries at its outer end a cam follower 75 which is adapted to ride in a second cam groove 76 in track assembly 73.

The cam grooves 72 and 76 are adapted to control the pivotal movement of corresponding clamp arms 66 and 67 as table 5 rotates with spindle 61, to thereby successively clamp and release bottles 40 in different successive sectors of the circular path of movement of the bottles from pocket wheel 19 to pocket wheel 23.

In order to prevent breakage of bottles and to allow for certain dimensional tolerances of the bottles, one of the clamp arms is cushioned. In the drawing, clamp arm 66 is shown as having a pivotal joint 77 therein with the outer part of the arm biased toward arm 67 by means of a coil compression spring 78 confined in mating recesses in the parting surfaces of the two arm parts. A larger bottle compresses spring 78 as the cam track forces arms 66 and 67 against the bottle.

The adjacent clamp arms 66 and 67 of adjacent sectors 64 are adapted to overlap when the clamps are open. For this purpose the outer end of clamp arm 66 constitutes a central finger 79 and the outer end of clamp arm 67 constitutes two vertically spaced fingers 80 and 81 adapted to receive finger 79 therebetween when the clamps are open, as shown in Fig. 8.

Each finger 79, 80 and 81 carries a clamping insert 82 shaped to fit the bottle 40 and which may be replaced by other inserts for different bottle shapes and sizes.

The construction of the clamps to provide the two vertically spaced fingers 80 and 81 on one side and the single central finger 79 on the other side, gives stability to the bottle when clamped.

The table 5 is driven at a constant speed by means of a ring gear 83 on the lower end of spindle 61 and which meshes with a pinion 84 on a vertical shaft 85 in gearbox 63 and having a beveled gear 86 on its lower end. A beveled gear 87 on the rear end of main cross shaft 21 drives gear 86.

The bottles 40 are removed from table 5 by the outgoing pocket wheel 23 which delivers them to the discharge conveyor 6. The construction for pocket wheel 23 is similar to that of pocket wheel 19 and a safety clutch actuating the other of the micro switches 56 is provided similar to clutch 46 for protecting the bottles as they enter the pocket wheel. The drive from worm 22 on shaft 14 for pocket wheel 23 is the same as the drive for pocket wheel 19 from worm 18 on shaft 14 and need not be further described here or shown in detail in the drawing.

The vertical frame 7 which carries the seal handling equipment comprises a front gear housing 88, a rear cap 89 centered over the table 5, and an overhead bracket 90 joining the cap and housing.

Three screw jacks 91, 92 and 93 are disposed to support frame 7 and to raise and lower the same for height adjustment. The jack 91 extends vertically at the axis of table 5 and pedestal 62, and jacks 92 and 93 are equally spaced from jack 91 and are spaced apart at the front of the machine.

The jacks 91, 92 and 93 are supported on base 1, and each jack comprises a vertical screw shaft 94 having a supporting thrust bearing 95 in a cast housing 96 supporting the same. A nut 97 is threaded onto the shaft 94 and carries a hollow cylindrical guide bar 98 extending vertically upward to support the corresponding part of frame 7.

The guide bar 98 of rear jack 91 terminates at its upper end in a shouder 99 and threaded end supporting cap 89. A nut 100 is threaded onto the upper end of the bar to secure the cap 89 thereon.

The shaft 94 carries a beveled gear 101 keyed thereto for turning the same.

The several jacks 91, 92 and 93 are geared together at the same height for guide bars 98 as shown in Fig. 9. For this purpose the two front jacks 92 and 93 are joined by a shaft 102 which has a beveled gear 103 on each end, each gear 103 meshing with the corresponding gear 101. The left hand jack 92 and rear jack 91 are connected by a shaft 104 which has a beveled gear 105 on each end, each gear 105 meshing with the corresponding gear 101.

The several jacks 91, 92 and 93 are adjusted in height simultaneously. For this purpose as shown in Fig. 6, the housing 96 for rear jack 91 carries a stub shaft 106 in suitable bearings. Shaft 106 has a beveled gear 107 on its inner end meshing with the corresponding gear 101. Shaft 106 has a sprocket 108 on its outer end driven by chain 109 from a drive sprocket 110 on a shaft 111 carried by bearings in a bracket 112 on the underside of cam track assembly 73. A crank 113 is secured to the outer end of shaft 111 for manually turning the same to adjust the height of frame 7 to accommodate different length bottles on table 5.

The gear housing 88 is supported rigidly on front jacks 92 and 93 by means of side lugs 114 receiving the upper ends of the corresponding guide bars 98, and by additional lugs 115 near the bottom of housing 88 and through which the corresponding guide bars 98 extend. Similar lugs 16 are provided on the front of base 1 and have bushings 117 fitting the corresponding guide bars 98 to accurately position the same against lateral displacement while providing for vertical adjustment of the guide bars. The seal handling apparatus is carried by frame 7 and comprises the magazine assembly 8, the stripper mechanism 9, the spearing mechanism 10, the transfer mechanism 11 and the applying mechanism 12.

The magazine assembly 8 is generally similar to the construction shown in copending application Serial No. 403,332, filed January 11, 1954, by the present inventors, and comprises a front bracket 118 carried by housing 88 and a tilt table 119 supported on the bracket by means of flexible plates 120 which provide for free floating of the table in a lateral direction only.

An electro-magnetic vibrator 121 is disposed on bracket 118 beneath the table to give a rapid lateral vibration to the table, as described in the application referred to above. Springs 122 are disposed between the sides of table 119 and the bracket 118 to determine the natural frequency of vibration for the table within the range of frequency of vibrator 121.

The table 119 supports a pair of parallel magazine troughs 123 and 124 thereon for containing packs of seals 125. The troughs are open topped for realy replenishing of seals therein by the operator, and tilt downwardly toward the rear for delivery of successive seals to stripper mechanism 9.

The stripper mechanism 9 comprises a stripper disc 126 carried by an oscillating shaft 127 mounted in suitable bearings 128 in a suspension support 129, with the shaft 127 parallel to troughs 123 and 124 on an axis passing midway between the troughs.

The support 129 has a plurality of lugs 130 extending upwardly therefrom and to which the flexible plate suspension members 131 are secured. Suspension members 131 have their upper ends secured to a bracket 132 carried rigidly by the housing 88, and are disposed to flex only in a direction parallel to the axis of shaft 127 to provide for accurate adjustment of the face of disc 126 toward and away from the rear ends of troughs 123 and 124 as shown in Fig. 12.

For the purpose of accurately locating disc 126 relative to the ends of troughs 123 and 124, the support 129 is biased toward the troughs by springs 133 disposed between a depending lug 134 on bracket 132 and an upstanding post 135 on support 129. A lever arm 136 is pivoted on a pin 137 depending from bracket 132 and extends to the right of shaft 127 behind the front wall of housing 88. Post 135 carries a stop rod 138 bearing against a button 139 carried by lever arm 136 so that pressing of the lever arm rearwardly effects a corresponding rearward movement of post 135 and the entire support 129 and shaft 127 and disc 126.

Springs 133 effect a constant forward biasing of arm 136 to hold an adjusting button 140 on the outer end of the arm 136 against a screw 141 threaded in a bushing in the front of housing 88. A hand knob 142 is secured upon the outer end of screw 141 to facilitate manual turning of the screw, and has a flange thereon with a dial 143 registering with a pointer 144 secured to the housing 88 adjacent to the knob.

The disc 126 is of substantial thickness and carries two stripper blocks 145 and 146 in corresponding recesses in the disc near the circumference of the latter. The stripper blocks are spaced approximately 90° apart on the disc so that upon 90° oscillation of the disc the left hand block 145 alternately registers with the left hand trough 123 and with the pick-off station 147, and the right hand block 146 alternately registers with the right hand trough 124 and with the pick-off station 147. When block 145 registers with trough 123 the block 146 is located at pick-off station 147, and when block 145 is at the pick-off station 147 the block 146 registers with the trough 124.

When either stripper block 145 or 146 moves from the corresponding trough 123 or 124 toward pick-off station 147 the block strips a seal 125 from the end of the trough and carries it to the pick-off station. For this purpose each stripper block has a plurality of vacuum holes 148 connected by a grid of small grooves 149 in the face thereof which are adapted to apply a suction to the surface of the seal and hold the latter thereon, as more fully described in application Serial No. 407,846, identified above.

A curved plate 150 is disposed on the face of disc 126 in circumferential alignment with blocks 145 and 146, and with its face projecting in the form of serrated curved ribs 151 having their peaks concentric with disc 126 and extending beyond the plane of the face of the blocks a distance nearly equal to the central thickness of a folded seal 125.

The function of the plate 150 is to meter the seals by preventing the seals from jamming so that as a stripper block strips a seal from the end of a trough the plate 150 follows upwardly to maintain the remaining seals in the trough against feeding and closing off the escape throat for the seals. As the stripper block returns to register with the trough the plate 150 moves down to where its end edge drops below the bottom of the trough.

The function of the ribs 151 in the face of plate 150 is to provide curved peaks for contacting the seals, thereby reducing the frictional area of contact therewith.

The throat through which a seal 125 is stripped from a trough is defined by the space between the face of the corresponding stripper block and the tongue 152 of a seal retainer assembly 153 secured to the front of housing 88 adjacent the corresponding magazine trough.

The assembly 153 comprises a guide bar 154 spaced from the housing 88 and to which is clamped a carriage 155 adapted to be raised or lowered on the bar to accommodate different length seals in the corresponding trough and to be secured in adjusted height position on bar 154 by a screw clamp 156 having a manual actuating lever 157.

The tongue 152 is on the end of a seal retainer 158 adjustably secured in a slot in the face of carriage 155 by means of a screw 159.

Since the folded edges of the seals have been found to vary substantially in effective overall thickness the present invention avoids interference by variations in such seal thickness at the folded edges and relies entirely upon the overall seal thickness at the center where tolerances can be kept more closely.

For this purpose the tongue 152 is substantially narrower than the corresponding trough, and retainer 158 is adjusted to hold the tongue central of the upper edge of the end seal in the trough.

The width of the throat between the tip of the tongue 152 and the corresponding stripper block is determined by the adjustment of knob 142 and should be a few thousandths of an inch greater than the central thickness of a folded seal, consideration being given to seal tolerances.

The blocks 145 and 146 are narrow relative to the width of the seal 125 so that the folded vertical edges of the seals in the trough are free to extend rearwardly beyond the plane of the face of the stripper block as the central part of the seal engages the face of the block.

It is well to have the face of the stripper blocks 145 and 146 raised outwardly a substantial amount from the face of the disc 126 so that the folded edges of the end seal do not engage the face of the disc. The plane of the peaks of ribs 151 should be forward of the face of the stripper blocks approximately the central overall thickness of a folded seal.

The seals 125 are supported in troughs 123 and 124 upon three laterally spaced parallel longitudinal slide bars 160 constituting the bottom of the corresponding trough. The central bar 160 terminates just short of the plane of the peaks of ribs 151 and the side bars 160 terminate near the face of disc 126 on opposite sides of the path of movement for the stripper blocks 145 and 146 and plate 150.

By reason of this construction for the bottom of the troughs the seals 125 are always supported therein regardless of the freedom of the folded edges to move toward disc 126.

The bottom throat for each trough is determined by the space between central bar 160 and the face of the corresponding stripper block or the ribs 151, as the case may be, and is always insufficient to let a seal drop downwardly at the end of the trough.

The upper throat for each trough is open only when a stripper block registers with the trough and is closed immediately by ribs 151 upon raising of the block with the end seal from the trough.

The seals are picked off from the blocks 145 and 146 alternately at station 147 by the spear mechanism 10 which comprises a rotary hub 161 having four generally radial arms 162 which carry corresponding spears 163 at their outer ends. Each spear is adapted to pierce the slit end of a folded seal 125 at station 147 and to enter the seal and partially open the same in picking it off from one of the stripper blocks 145 and 146.

The rotation of hub 161 is synchronized with the oscillation of disc 126 so that as each successive seal 125 approaches station 147 a corresponding successive spear 163 enters the seal and picks it off from the block.

In a pick-off operation at station 147 the spear 163 starts to enter the seal before disc 126 reaches the end of its oscillation stroke and the seal comes to a stop at the station. This initial entering of the spear in case of a seal being raised from the left hand trough 123 takes place at the trailing edge of the seal. The initial entering of the spear in case of a seal being raised from the right hand trough 124 takes place at the leading edge of the seal.

It is desirable that the tip edge of the spear 163 always enter the split edge of the seal near the center of the slit therein. The construction therefor compensates for the fact that at the time of initial entry of the spear the trailing edge of the seal from trough 123 is farther from the vertical center line for the circular path of spear movement and from the rotary center thereof than is the leading edge of the seal from trough 124.

This compensation is provided by the two spears 163 which always enter seals from trough 123 being tapered to have the spearing point or edge of the spear travel in a circular path of a little greater radius than that for the spears 163 which always enter seals from trough 124.

The maximum length of seal to be handled is generally about three and one-half inches and the machine should be capable of applying seals of different length from about one inch to the maximum. For this purpose different stripper blocks 145 and 146 are employed.

for each different size of seal, the blocks in each case having the full length of the recesses in disc 126 but having a grid 149 of a size generally corresponding to the seal size.

Since it is necessary that the left hand edge of the seal 125 at pick-off station 147 always register with the base of the spear 163 the troughs 123 and 124 are positioned to always provide for a definite location of the corresponding seal edge in the trough with respect to disc 126.

In the machine illustrated, the left hand trough 123 is located with the bottom thereof approximately one and three-quarters inches below the horizontal diameter of disc 126 in the plane of the face of the stripper block 145, and is just 90° from the index location for the left hand edge of the seal at the pick-off station 147. The right hand trough 124 is located by means of a spacer support 164 at a height above table 119 that will dispose the upper index edge of seal 125 at the end of the trough approximately one and three-quarters inches above the horizontal diameter of disc 126 and 90° from the index location for the left hand edge of the seal at pick-off station 147.

This same location for the index edge of the seals in troughs 123 and 124 should be used for all sizes of seals. For a three and one-half inch seal it would not be necessary to employ the spacer support 164 for trough 124.

Since stripper block 146 extends the full distance from the upper index edge of the seals in trough 124 down to the top of table 119 when registering with the trough, and ribs 151 end at or near the top of the table, where short seals are employed as shown, it is desirable to have the stripper block made up of two portions: the upper portion having the grid 149 and lying in the plane of the face of the block, as previously described, and the lower portion having raised ribs 165 corresponding to ribs 151 and of approximately the same overall height position.

The spears 163, as shown, are approximately an inch and a half long, since this length has been found to be sufficient for spearing all sizes of seals. The spear 163 at the pick-off station 147 is located with its center approximately registering with the vertical radius from the center of hub 161 so that at the station the spear edge is approximately three-quarters of an inch to the right of the vertical center line of hub 161 and the index base of the spear is approximately three-quarters of an inch to the left of the vertical center line of the hub. The index base of the spear coincides with the index location for the left hand edge of the seal at pick-off station 147.

In operation the spear mechanism 10 is made to dwell as a spear reaches station 147 and at that instant the outer wall of the seal 125 is clamped to the body of the spear 163 and the suction is released from the seal 125 with respect to grid 149 in the corresponding stripper block. Thereupon the rotation of the hub 161 is resumed and spear 163 carries the seal away from the disc 126.

Where the seal 125 being picked off comes from the trough 123 the stripper block 145 starts to move back from station 147 toward the trough as the spear 163 starts to accelerate in rotating away from the station, the respective movements being in the opposite direction. Where the seal 125 is from trough 124 the direction of movement of spear 163 and of stripper block 146 will be nearly the same, with the spear accelerating somewhat faster than the block.

In order that the seal 125 can accelerate with spear 163 in this latter case the end ledge of ribs 165 is beveled to prevent catching of the edge of the seal thereon.

Also it has been found that by disposing the axis for shaft 127 and disc 126, when projected to a horizontal plane, offset to the right (counterclockwise when looking from above) of a corresponding projection of the axis of hub 161 an amount approximating about one degree (1°), the spears 163 tend to lift the seals forwardly away from the face of the corresponding stripper block as the spears accelerate from a momentary dwell.

Figure 14:
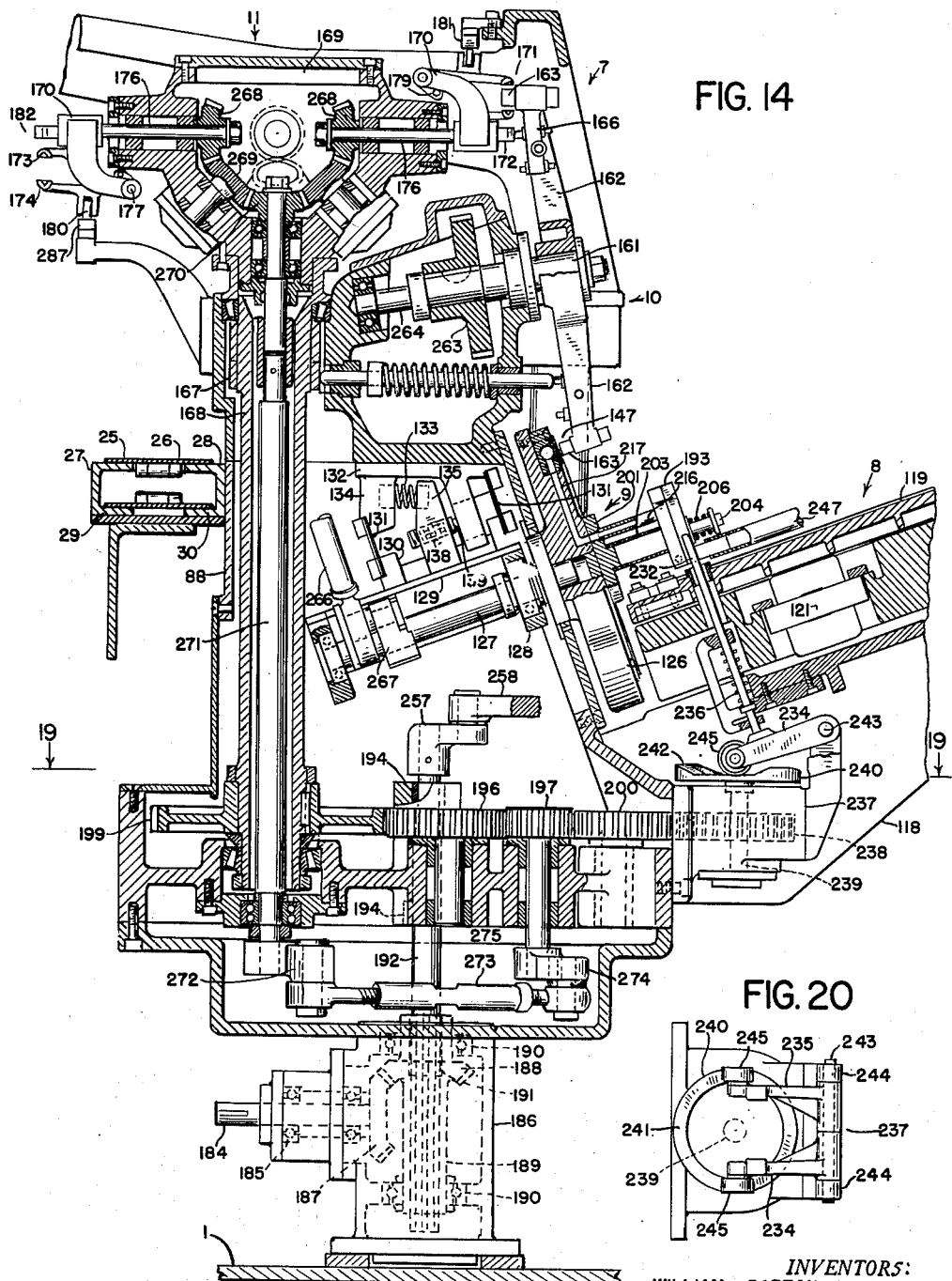
Fig. 14 is a vertical section of the stripper disc and spear mechanism with the two finger transfer mechanism and the drive therefor.
Figure 22:
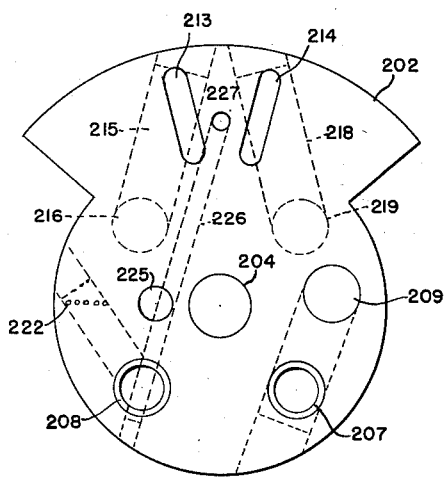
Fig. 22 is a face elevation of the valve body.
Figure 23:
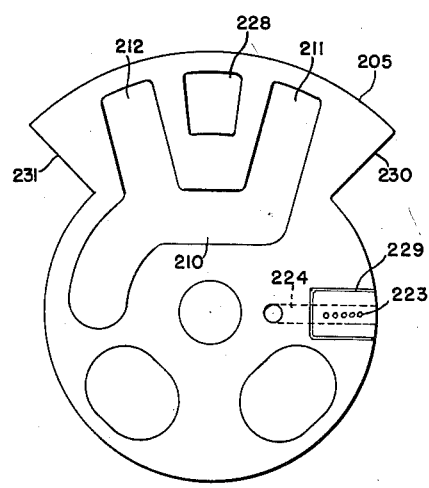
Fig. 23 is a face elevation of the valve member.
Figure 24:
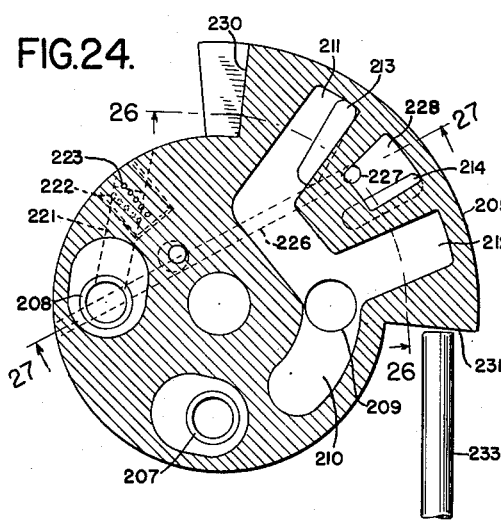
Fig. 24 is an elevation of the assembled valve member and valve body showing parts in section and the mating ports dotted when the valve is in one extreme position.

The angular relation of the axis of shaft 127 and hub 161 when viewed inside elevation as in Fig. 14 is also important in the construction and operation of the seal handling mechanism. Referring to Fig. 14 it will be noted that the troughs 123 and 124 are set at an angle of about 20° from the horizontal and that the axis of shaft 127 and disc 126 is at the same angle.

The axis for hub 161 is set at approximately a 10° angle from the horizontal and spears 163 are mounted on arms 162 at an angle of 10° to correspond to the angular position of disc 126 when a spear registers with a stripper block at station 147. In this way the plane of seal movement on disc 126, which is approximately 20° from the vertical, is changed to a plane for seal movement on the rotating spears 163 of 10° from the vertical.

The seals 125 are clamped upon the successive spears 163 by magnetic clamps 166 of the type described in application Serial No. 408,758 filed February 8, 1954 by Warren E. Erickson, one of the present joint inventors. As a spear completes its entry of a seal 125 at the pick-off station 147 and momentarily dwells the clamp 166 is actuated by a cam 167 on the spindle 168 of the rotary member 169 carrying the two finger heads 170, to effect magnetic closing and holding of the clamp upon the seal. As a spear with its seal reaches the upper pick-up station 171, the clamp 166 is opened by means of a cam 172 on member 169.

Prior to opening of clamp 166 at station 171 the two fingers 173 and 174 of a head 170 enter the seal 125 by straddling spear 163, and just before the trailing (former index edge) of the seal is engaged by the base of the fingers on the head 170, the cam 172 actuates the clamp to effect release of the seal from the spear so that it is free to be picked up by the head 170 as the latter continues in its rotation past station 171.

It will be noted that by reason of the angularity of the spear 163 relative to the plane of its circular path of movement as represented by the arms 162, the spear being set at 10° from the plane as previously described, the seal 125 at station 171 is disposed in a vertical plane with its vertical edges split to receive the fingers 173 and 174 traveling in a horizontal direction. In this way the seal is gradually oriented from a 20° tilt to a vertical position, thereby facilitating its application to a vertical bottle top.

The transfer mechanism 11 comprises the continuously rotating member 169 mounted on the top of vertical spindle 168 and carrying four two-finger heads 170 spaced approximately 90° apart circumferentially of the member.

Each two finger head 170 comprises a body 175 clamped upon the outer end of a shaft 176 disposed radially of member 169. The body 175 has an L-shaped finger 173 secured to the outer face thereof and extending transverse to the axis of shaft 176. The L-shaped finger 174 is pivoted to the upper part of body 175 on a pivot pin 177 extending transverse to the axis of shaft 176 and parallel to the outer free end of finger 173 so that the outer free ends of both fingers are maintained parallel with one finger spaced above the other.

A coil compression spring 178 is carried by the body 175 and engages the pivotal arm of finger 174 to bias the finger away from finger 173. A stop 179 is carried by an extension of the pivotal arm of finger 174 to engage a part of body 175 and limit the separation of the fingers under the influence of spring 178.

The fingers 173 and 174 are partially closed together by means of a roller 180 carried on the pivotal arm of finger 174 and disposed to engage a stationary cam track 181 on housing 88 to press the finger toward finger 173 as the head approaches station 171. As the fingers 173 and 174 complete their entry of a seal 125 at station 171 the cam track 181 discontinues its pressure upon roller 180 thereby releasing spring 178 and stretching the seal upon the fingers.

The seal 125 is then carried by the head 170 approximately through 180° of rotation of member 169 to a transfer station 182 where the seal is transferred to an eight finger head 183 of mechanism 12. During the transfer of the seal from station 171 to station 182 by head 170, the latter is turned through 180° by the turning of shaft 176 so that while the free ends of fingers 173 and 174 point forwardly as head 170 passes station 171 they point rearwardly as the head passes station 182, whereby the seal is delivered to the eight finger head 183 more readily.

For this purpose the construction for turning the heads 170 incorporates the principles of the invention described in the copending application Serial No. 410,008 filed February 12, 1954 by William Barton Eddison, one of the present inventors. The specific construction is different from that set forth in said application and is incorporated in the drive for the entire front seal handling mechanism, including the stripper mechanism 9, spearing mechanism 10 and transfer mechanism 11, as shown in Figs. 10 to 13, inclusive.

The drive referred to is taken from the cross shaft 21 which is driven from the main drive shaft 14 by worm gear 20. The forward end of shaft 21 is coupled to a shaft extension 184 supported in bearings 185 in the rear wall of a housing 186 on base 1. The inner forward end of shaft 184 carries a beveled gear 187 which meshes with a corresponding beveled gear 188 on a hollow vertical shaft 189 mounted in suitable vertically spaced bearings 190 in housing 186. The upper end of shaft 189 carries a spline insert 191 for receiving and driving a spline shaft 192 depending downwardly from housing 88.

The transmission gearing in housing 88 starting with input drive shaft 192 must effect the 90° oscillation of stripper disc 126, the intermittent rotation and dwell of hub 161 and spears 163, the continuous rotation of spindle 168 and member 169, and the turning of the two finger heads 170 with appropriate dwell periods as they pass stations 171 and 182. The gearing also drives a valve 193 on the front of disc 126 for connecting stripper blocks 145 and 146 to a source of vacuum.

The vertical drive shaft 192 is mounted in suitable vertically spaced bearings 194 and carries a drive gear 195 secured thereon. Gear 195 drives a main gear 196 which in turn drives three different gears, 197, 198 and 199, meshing therewith. Gear 197 drives a valve control gear 200 for actuating valve 193.

The valve 193 comprises a clamp plate 201 bolted to the face of disc 126 and carrying a valve body 202 axially of the disc by means of a forwardly projecting tube 203.

The valve body 202 in turn has an axial stud 204 which pivotally carries a valve member 205 which is biased against the face of the body at all times by means of a coil spring 206 compressed between the head of stud 204 and valve member 205.

The valve 193 is adapted to connect stripper blocks 145 and 146 alternately to a suction conduit 207, and to connect the opposite block momentarily to an air conduit 208 in each instance. The suction is applied to the respective stripper block when it registers with the corresponding magazine trough, and is maintained until the seal arrives at station 147 and is clamped to a spear 163. Upon release of the suction from the seal a momentary blast of air is supplied to the stripper block through valve 193 from conduit 208 and thereafter the block is merely open to the atmosphere during its return from station 147 to a position of registry with the corresponding magazine trough.

Conduits 207 and 208 pass through corresponding openings in the lower side of valve member 205 and into the valve body 202. The openings in valve member 205 for receiving the conduit are spaced equally on opposite sides of the vertical center line of the member and each constructed as two semi-circles joined by a segment contained between radii from the axial pivotal center of the valve member and disposed 10° apart, to thereby accommodate a 10° oscillation of the valve member in its actuation.

The right hand conduit 207 connects with a passage 209 in valve body 202 which always opens into a manifold groove 210 in the inner face of member 205 which extends generally concentric with respect to the pivotal axis of the member and has two radially disposed branches 211 and 212 approximately 30° apart and equally spaced from the vertical center line of the member.

The valve body 202 has two separate radially disposed slots 213 and 214, respectively, in its face equally spaced from the vertical center line and adapted to register alternately with the corresponding branch 211 or 212 of manifold groove 210. For this purpose the outer edges of the slots 213 and 214 are spaced apart approximately 30°;

Slot 213 connects through passage 215 in valve body 202 to a tube 216 which extends between body 202 and clamp plate 201 where it connects with a passage 217 in disc 126 opening into the hollow stripper block 145. Slot 214 connects through passage 218 in valve body 202 to a tube 219 which extends between body 202 and clamp plate 201 where it connects with a passage 220 in disc 126 opening into the hollow stripper block 146.

When disc 126 moves counterclockwise and registers stripper block 145 with trough 123 the valve member 205 is actuated clockwise to register groove branch 211 with slot 213 and thereby connect vacuum tube 207 to the stripper block 145. Similarly, when disc 126 moves clockwise and registers stripper block 146 with trough 124 the valve member 205 is actuated counterclockwise to register groove branch 212 with slot 214 and thereby connect vacuum tube 207 to the stripper block 146.

The left hand conduit 208 constitutes an air pressure line and connects with a passage 221 in valve body 202 and which in turn has a plurality of small orifices 222 in the face of the valve body and extending in a line along the horizontal center line for the valve body near the outer circumference of the body. Corresponding orifices 223 in the inner face of valve member 205 are disposed to register with orifices 222 when member 205 is centered with respect to body 202, i. e. when member 205 is approximately midway of its movement in either direction of actuation.

The ports 223 in valve member 205 connect with a radial passage 224 which in turn has an opening in the inner face of the member adapted to register at all times with an opening 225 in body 202. Opening 225 is connected by a passage 226 to another opening 227 in the face of body 202 and which is disposed midway between slots 213 and 214 and on the vertical center line of the body.

A recess 228 in the inner face of valve member 205 and midway between branches 211 and 212 is adapted to alternately connect opening 227 with slots 213 and 214 upon alternate actuation of the valve member in opposite directions.

From the description given above it will be noted that as valve member 205 passes the midway position in its actuation in either direction it effects registry of ports 223 therein with ports 222 in the valve body 202, thereby momentarily connecting the air pressure line 208 to the corresponding stripper block located at station 147. This fully overcomes any suction behind the seal 125 on the stripper block at station 147 and in fact blows the seal away from grid 149 of the stripper block.

In order to prevent air pressure from ports 222 tending to lift valve member 205 from valve body 202 during the application of suction to a seal, a groove 229 in the inner face of valve member 205 extends around the position of ports 223 and opens radially outward of the member on opposite sides of the ports. The groove 229 is spaced from the ports 223 to avoid registry with ports 222 at any position for valve member 205. In this way the groove 229 serves merely as a leakage escape or pressure release for leakage that might otherwise effect separation of the faces of the valve member and valve body by entrapment of air therebetween.

The valve member 205 has a pair of radially extending shoulders 230 and 231 disposed to face in opposite directions circumferentially of the member and 90° apart back to back in the upper portion of the block. By the construction shown the left hand shoulder 230 moves to a position 5° below the horizontal center line of the member when disc 126 moves stripper block 145 to a position of registry with trough 123. At that instant valve member 205 is actuated by a vertical rod 232 engaging shoulder 230 and pushing it upwardly to a position 5° above the horizontal center line.

Figure 25:
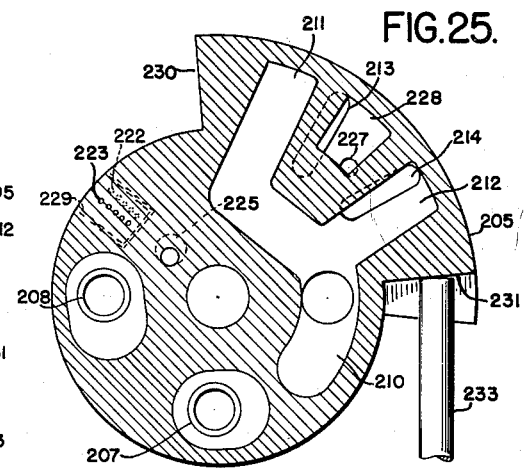
Fig. 25 is similar to Fig. 24 showing the valve in the opposite extreme position.
Figure 26:
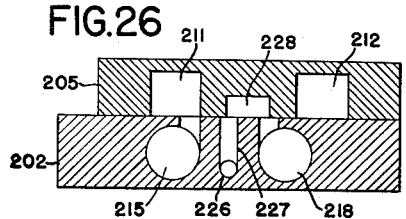
Fig. 26 is a transverse section taken on line 26—26 of Fig. 24 showing the last stage of port connections.
Figure 27:
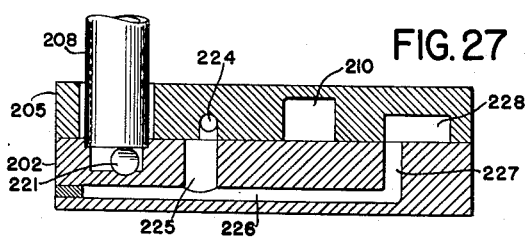
Fig. 27 is a transverse section taken on line 27—27 of Fig. 24 showing the air passages.
Figure 28:
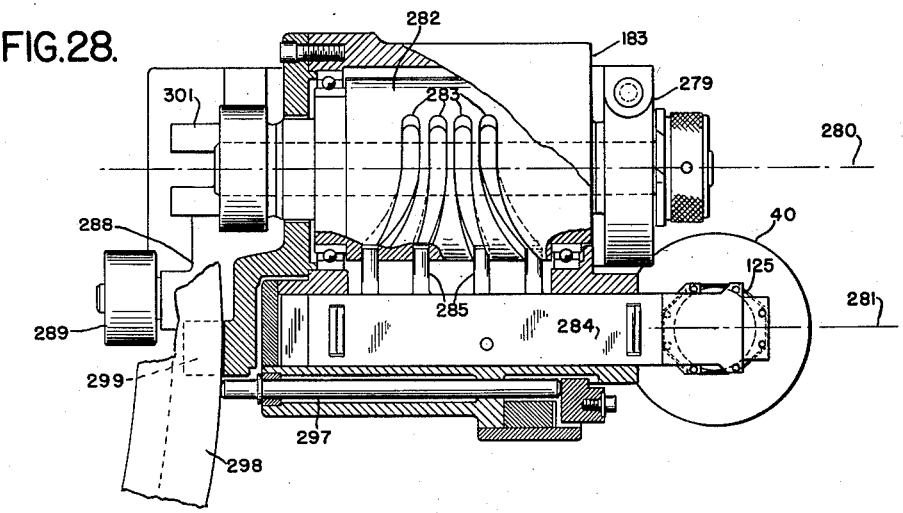
Fig. 28 is a detail section through the eight finger head.
Figure 29:
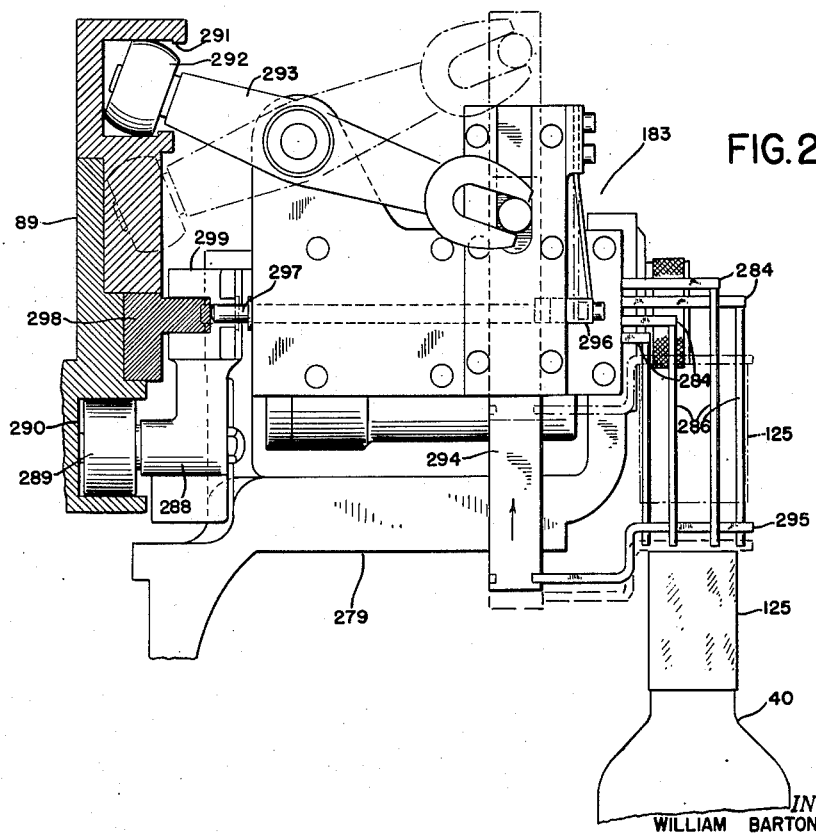
Fig. 29 is a side elevation of the eight finger head showing the stripper slide.
Figure 19:
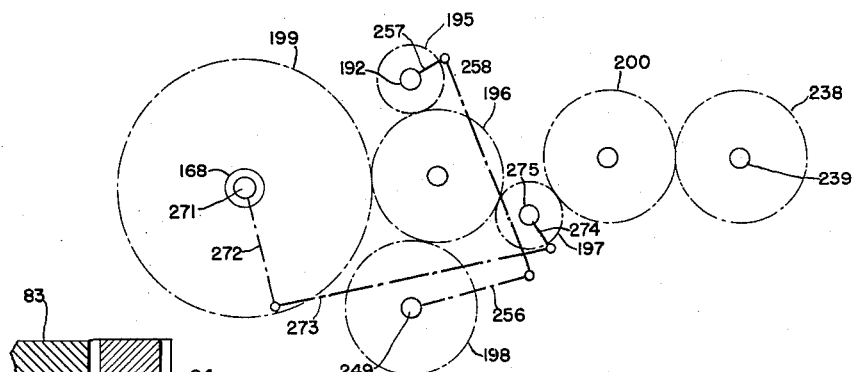
Fig. 19 is a top plan view of the gear layout for the seal handling mechanism and taken as a section on line 19—19 of Fig. 14.
Figure 31:
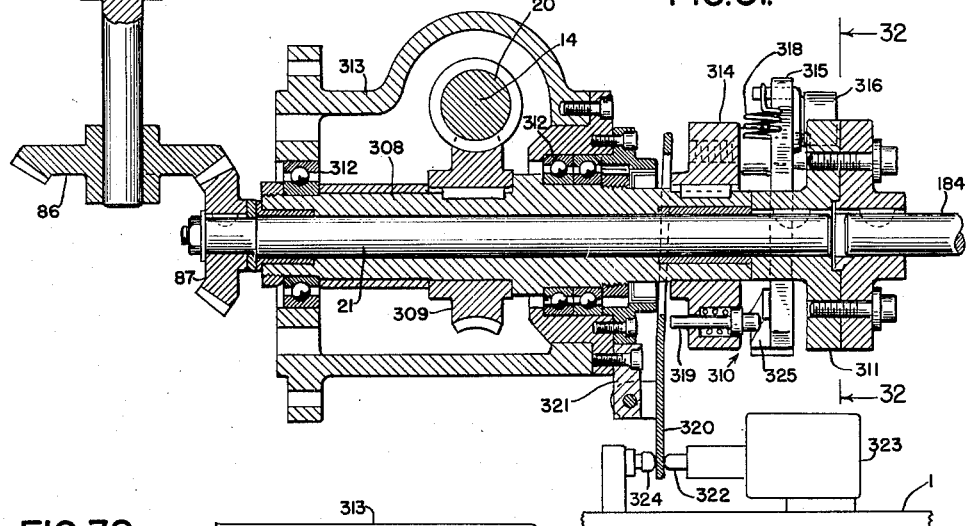
Fig. 31 is an axial section of the main cross shaft showing the main safety clutch.
Figure 32:
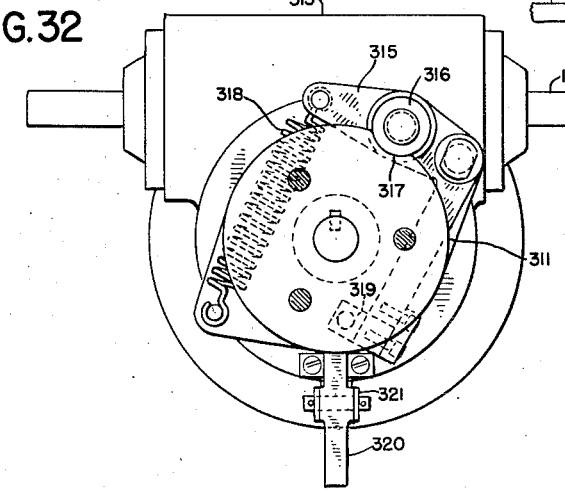
Fig. 32 is a section taken on line 32—32 of Fig. 31.
Figure 33:
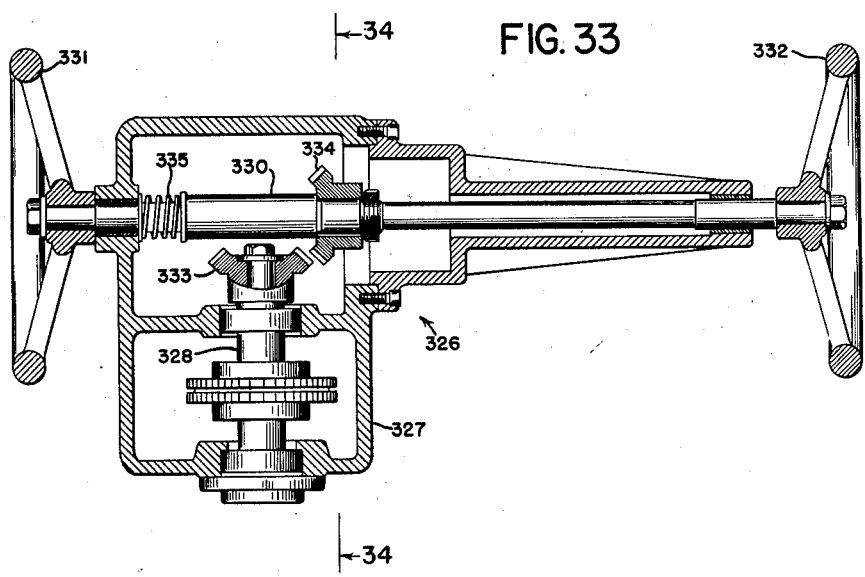
Fig. 33 is a horizontal section through the manual inching mechanism.
Figure 34:
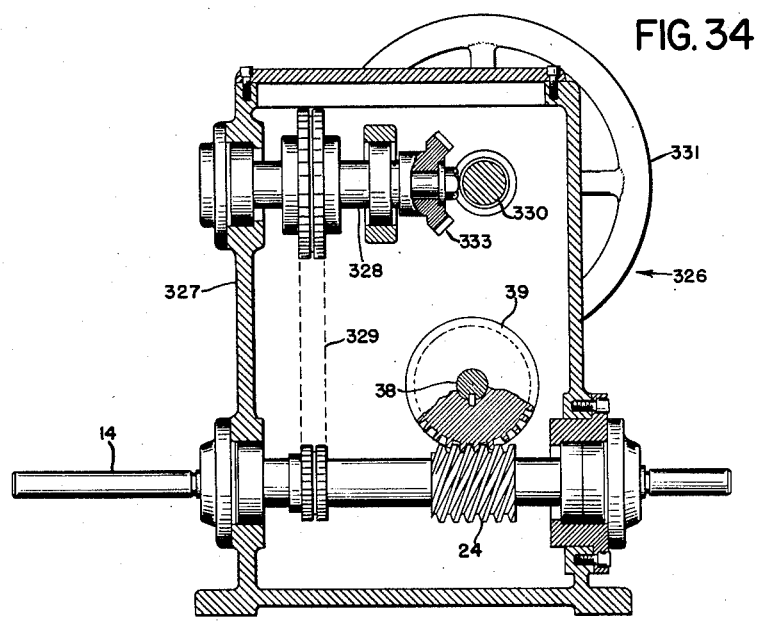
Fig. 34 is a vertical section taken on line 34—34 of Fig. 33.

Similarly, the right hand shoulder 231 will then move to a position 5° below the horizontal center line of the member when disc 126 moves stripper block 146 to a position of registry with trough 124. At that instant valve member 205 is actuated by a vertical rod 233 engaging shoulder 231 and pushing it upwardly to a position 5° above the horizontal center line, as shown in Fig. 25.

Rods 232 and 233 extend vertically downward through slide bearings in the bracket 118 and are supported by suitable pads on the corresponding pivotal arms 234 and 235. Coil spring 236 is carried by each rod between a fixed part of the slide bearing therefor and a spring seat on the rod to bias the latter downwardly upon its support at all times.

The valve control assembly 237 which is secured to the front of housing 88 beneath bracket 118 contains a gear 238 on a vertical shaft 239 and meshing with gear 200. Shaft 239 drives a cam table 240 which has a vertically facing circular roller track 241 with two diametrically opposite lobes 242 providing high points for raising rods 232 and 233 twice for each revolution of the table 240.

The arms 234 and 235 are pivoted separately and side by side upon a pin 243 joining a pair of upstanding spaced lugs 244 on the assembly housing. The free end of each arm carries a roller 245 which rides on track 241 on cam table 240. The rollers 245 are disposed substantially diametrically opposite each other on table 240 to be raised simultaneously upon the corresponding 180° turning of the table. Raising of arms 234 and 235 by the rollers 245 being engaged by lobes 242 effects a lifting of the corresponding rods 232 and 233 and actuation of valve member 205 in a direction away from its previous setting.

The conduits 208 and 207 extend between magazine troughs 123 and 124 to pass over the front edge of table 119 and bracket 118 and downwardly to pipes connecting with corresponding suction and pressure lines 246 and 247. Suction line 246 connects with a suitable vacuum pump 248 in the housing 2. Pressure line 247 connects with any air pressure line available in the shop, and should have a pressure regulator therebetween for keeping the pressure in line 208 within a suitable range to avoid injury to the seals.

Returning to the gear drive, gear 198 drives the disc 126 and the spear hub 161. For this purpose the gear 198 is secured to a vertical shaft 249 which carries a beveled gear 250 at its upper end. A second vertical shaft 251 extends in alignment with shaft 249 and carries a beveled gear 252 spaced above and facing gear 250. The gears 250 and 252 are of the same size and have the same number of teeth.

A pair of miter gears 253 and 254 are mounted on a transverse shaft 255 and disposed facing each other and meshing with gears 250 and 252 at diametrically opposite points. The shaft 255 is mounted in suitable end bearings in a housing 256 which carries bearings for shafts 249 and 251.

When the direction of transverse shaft 255 remains fixed the drive ratio between shafts 249 and 251 will be one to one. When shaft 255 is changed in direction as by an oscillation of housing 256, the shaft 251 will either be speeded up or slowed down relative to shaft 249, depending upon whether housing 256 is rotated in a direction opposite to the direction of rotation for shaft 249 or in the same direction as shaft 249.

Oscillation of housing 256 is produced by a crank 257 on the upper end of shaft 192 and connected to the housing by a link 258. The ratio between shaft 192 and gear 198 is such that crank 257 will have two revolutions for each revolution of the gear and its shaft 249, which means that there are two alternate periods of acceleration and deceleration for each revolution of shaft 251.

The upper end of shaft 251 carries a beveled gear 259 meshing with a corresponding gear 260 on a shaft 261 at the upper end of housing 88 and extending substantially parallel to the shaft 127 of disc 126. The forward end of shaft 261 carries a helical gear 262 which meshes with a corresponding gear 263 on the shaft 264 carrying hub 161. The ratio of gears 262 and 263 is such that the shaft 264 and its hub 161 rotate half the speed of shaft 261. Furthermore, the gears 262 and 263 are constructed to compensate for a 10° offset in direction for shafts 261 and 264, as will be described hereinafter.

By the several ratios stated it will be noted that the shaft 264 is accelerated and decelerated four times for each revolution whereby each spear as it reaches the station 147 and again as it reaches station 171 slows to an approximate dwell for the purposes previously described. In addition, each spear dwells at the intermediate 90° positions while its adjacent spears are at the corresponding stations.

The rear end of shaft 261 carries a crank 265 which is connected by a tie rod 266 to a corresponding crank 267 on the rear end of shaft 127 whereby for each revolution of shaft 261 and of shaft 251 there is one complete oscillation for disc 126 to deliver two seals successively to station 147.

The gear 199 is keyed to the lower end of the hollow spindle 168 which carries rotary member 169 with its two finger heads 170.

The ratio between gears 195 and 196 is such that gear 195 has two revolutions for each revolution of gear 196. The ratio between gears 196 and 197 is such that for each revolution of gear 196 the gear 197 has two revolutions. The ratio between gears 196 and 198 and also 200 is a one to one ratio. The ratio between gears 196 and 199 is such that for each two revolutions of gear 196 the gear 199 has one revolution.

The several gear ratios described effect a rotation of member 169 corresponding to that of hub 161 so that four two finger heads 170 on member 169 correspond to the four spears 163.

During rotation of member 169 the radial shafts 176 which carry the two finger heads 170 are rotated as previously described. To accomplish this the inner end of each shaft 176 carries a gear 268 which meshes with an idler gear 269 which in turn meshes with a central gear 270 carried by a vertical shaft 271 extending downwardly through the hollow spindle 168. Gear 270 is common to all for idler gears 269.

If shaft 271 and its gear 270 are held against rotation the shafts 176 and two finger heads 170 carried thereby will rotate in exact accordance with the rotation of member 169. If shaft 271 is slowly rotated in the direction of rotation of members 169 the two finger heads will turn more slowly than does member 169, and if shaft 271 is increased in speed until it rotates at the same speed as member 169 the turning of shafts 176 and heads 170 will cease, thereby producing a dwell in the turning of the heads.

It has been found desirable to have a dwell in the turning of heads 170 at each of the stations 171 and 182, in which case the 180° turning of the heads must take place during approximately 150° of turn of member 169 to provide a dwell of 30° at the approach and passing of each station.

In order to effect the dwell referred to the lower end of shaft 271 carries a crank arm 272 which is connected by a link 273 to a crank 274 on the lower end of the shaft 275 for gear 197. The crank 272 is substantially four times as long as crank 274 and the gear ratio between gear 197 and gear 199 is such that gear 197 rotates four times while gear 199 rotates once. With the ratios stated the crank 274, which makes a full rotation for each revolution of gear 197, effects an oscillation of shaft 271 whereby the shaft rotates substantially with spindle 168 during the period of desired dwell in the turning of heads 170 and rotates in the opposite direction from the spindle intermediate the periods of dwell.

Each head 170 is thereby made to dwell at each station 171 and 182 and also at the 90° intermediate position when adjacent heads are passing the stations.

The seal applying mechanism 12 comprises a rotary member 276 carrying approximately twelve eight finger heads 183 of the type set forth in copending application Serial No. 410,194 referred to above.

The member 276 is carried by a hollow spindle 277 extending vertically downward into the upper end of spindle 61 and splined thereto to provide for turning of member 276 by common rotation of the spindles 277 and 61. The spline between spindles 277 and 61 provides for adjusting the height of member 276 by the raising and lowering of frame 7 as previously described.

For this purpose the spindle 277 extends upwardly from member 276 into the hollow cap 89 and is suspended therefrom by means of a thrust roller bearing 278 between the upper end of spindle 277 and the inner surface of the cap.

Each head 183 is pivotally carried by a bracket 279 secured to a flat face on member 276. The pivotal axis 280 of the head is horizontal and parallel to the radius 281 from the center of member 276 to approximately the center of the top of bottle 40 to be sealed thereby, with the axis 280 on the trailing side of the radius 281.

Each bracket 279 carries the stationary cylindrical member 282 upon which the corresponding head 183 is rotationally mounted. The member 282 has four cam grooves 283 in its outer cylindrical surface and extending approximately 90° thereof.

Head 183 contains four adjacent plates 284 which are movable parallel to the axis 280 by means of cam followers 285 individually secured to the corresponding plates and engaged in the corresponding cam groove 283. As head 183 oscillates through 90°, the plates 284 are moved relatively by reason of the cam grooves 283 and followers 285.

Each plate 284 carries two spaced parallel fingers 286 which cooperate with the fingers of the other plates in a contracted relation to pick up a seal 125 from a two finger head 170 by entering the seal in between the two fingers 173 and 174 at transfer station 182. As the eight fingers 286 enter the seal a cam track 287 engages roller 180 and presses finger 174 toward finger 173 just sufficient to release the seal 125 for transfer to the eight fingers 286.

As the eight finger head 183 is moved by member 276 to a position above a bottle 40 a crank arm 288 on the inner end of the head effects a 90° turning of the head on its axis 280 to move the finger 286 from a horizontal forward position to a vertical downward position. As the head turns the 90° the cam grooves 283 force plates 284 to a position separating fingers 286 and opening the seal 125 to a cylindrical shape preparatory to dropping the seal upon the bottle top.

Also, as the head 183 is rotated the 90° described, the fingers 286 moved forwardly and present the seal 125 vertically over the bottle top.

The arm 288 has a cam roller 289 on its end adapted to ride in the continuous cam groove 290 extending circumferentially of cap 89 and which oscillates the corresponding head 183 for the above described 90° and return for each revolution of member 276.

A second cam groove 291 on the circumference of cap 89 extends only over that sector of table 5 in which the seal is pushed onto the bottle top, and receives a roller 292 on the end of a lever arm 293 pivoted on the head 183 and which actuates a slide 294 which carries a pusher bar 295 adjacent fingers 286 for stripping the seal downwardly from the fingers and onto the bottle top.

The slide 294 is locked in bar retracted position by a spring pressed detent 296. The detent 296 is released from the slide 294 by a push rod 297 extending parallel to the axis 280 and which is actuated by engagement of the inner end of the rod with a track 298 on the outer circumference of cap 89.

The track 298 extends only for that part of the circumference of the cap 89 corresponding to the segment of the path of bottle travel on table 5 wherein a seal 125 is being applied to a bottle, and passes between two sides of a channel guide 299 on the crank arm 288 to secure the head in position with the fingers 286 indexed relative to the bottle top. As guide 299 leaves track 298 the crank 288 turns the head 183 back up to the position where the contracted fingers 286 approach another seal at the transfer station 182.

As the head 183 approaches and passes the transfer station a track 300 on cap 89 passes between the sides of a channel guide 301 on the inner end of the head to secure the latter against rotation and with the fingers 286 horizontal and pointing forward in the direction of travel.

The machine described has a main manual clutch 17 and suitable safety clutches similar to the overload clutches 46 for the pocket wheels.

Clutch member 17 is actuated by a yoke 302 carried by a pivotal lever 303 and having shoes 304 riding in a circumferential groove 305 in member 17. The lever 303 is connected by link 306 to a hand lever 307 on the front of the housing 2.

The cross shaft 21 and its extension 184 are driven from worm gear 20 by means of a sleeve 308 having a gear 309 meshing with the gear 20. A safety clutch 310 couples the end of the sleeve to the coupling member 311 that joins shafts 21 and 184 end to end.

The sleeve 308 is mounted in suitable anti-friction bearings 312 in a housing 313 secured to the front of gear box 63, and shaft 21 extends axially of the sleeve.

The safety clutch 310 comprises a clutch driving plate 314 keyed on the end of sleeve 308 and carrying a pivotal lever 315 of L shape. The short arm of lever 315 carries a roller 316 which normally rides in a corresponding notch 317 in the circumference of a clutch plate constituting the coupling member 311. A spring 318 biases the arm of lever 315 in a direction to retain roller 316 in notch 317 to effect driving of shafts 21 and 184.

In the event either shaft is stopped in an emergency or unduly resists turning, the roller 316 rides up out of notch 317 and thereby stops driving shafts 21 and 184.

At the same time the long arm of lever 315 is pivoted in a direction to engage a trip pin 319 carried by clutch plate 314 and which in turn presses against a switch arm 320 pivotally carried by a bracket 321 on housing 313.

The switch arm 320 has its outer end disposed between the end of the plunger 322 of micro-switch 323 and an adjustable stop 324. When arm 320 is actuated by trip pin 319 the switch 323 opens the circuit of motor 13. The trip pin 319 is spring pressed out of engagement with switch arm 320.

Since the direction of pivoting of lever 315 is normal to the axis of pin 319, a beveled cam 325 mounted on the end of the lever is employed to engage the end of the pin to move the pin against its spring.

For the purpose of manually inching the machine during making adjustments thereto a hand wheel assembly 326 is provided at the discharge end of the machine near the worm gear 24 and in a housing 327 containing gears 24 and 39 and shaft 38.

The assembly 326 comprises a countershaft 328 at the upper end of housing 327 and which is connected by a chain 329 and suitable sprockets to the last section of shaft 14 to rotate therewith. A transverse shaft 330 extends through housing 327 and carries the hand wheels 331 and 332 on its opposite ends for ready turning of the same.

Shaft 330 is at right angles to shaft 328 and extends past the end of the latter. Shaft 328 carries a beveled gear 333 on its end facing shaft 330. Shaft 330 carries a beveled gear 334 adapted to mesh with gear 333 but normally held out of engagement therewith by a spring 335 biasing shaft 330 axially in a direction tending to separate the gears.

When it is desired to manually inch the machine, clutch 17 may be opened first, and then either hand wheel 331 or 332 is moved to effect engagement of gears 333 and 334 and thereupon turned as desired. Release of the hand wheel permits spring 335 to disengage the gears 333 and 334.

The electrical circuit for the machine may include a self-blocking circuit (not shown) for motor 13 wherein the motor is electro-magnetically stopped upon opening of the drive circuit.

In Figure 2 there is shown a simple wiring diagram wherein the motor switch 336 is closed by energization of a solenoid 337 in a holding circuit having a normally open switch 338 closed by energization of the solenoid.

The normally open push button starter switch 339 is disposed parallel to switch 338 and each energizes the solenoid 337 when closed. The stop button switch 340 is normally closed and is adapted to open the holding circuit and de-energize solenoid 337 when pressed by the operator.

The safety clutches 46 for pocket wheels 19 and 23 actuate corresponding normally closed micro switches 56 to open the holding circuit and de-energize solenoid 337 in an emergency. Likewise safety clutch 310 for cross shaft 21 actuates micro switch 323 to open the holding circuit and de-energize solenoid 337 in an emergency.

The metering wheel 42 may have a similar safety clutch (not shown) adapted to actuate micro switch 341 in the holding circuit and de-energize solenoid 337.

De-energization of solenoid 337 opens the main motor switch 336 and also holding switch 338 so that the machine will not restart until the operator presses the start button 339.

The machine has been described and shown in detail in order to fully illustrate the principles of the invention. It will be understood that the invention is not to be limited to the construction described or shown where equivalent structure is available.

By reason of the drive for the several parts of the machine stemming from a single power source, all parts of the machine are kept in coordination so that accurate registry of seals and bottles is obtained. Since the main drive shaft is high in speed and worm gears are employed for driving the several parts of the machine therefrom, the invention disposes the several safety clutches between the corresponding worm gears and the parts being driven thereby.

The several safety clutches are constructed to maintain the necessary phase relationship of the corresponding parts of the machine when the clutches re-engage. For this purpose, for instance, the safety clutches 46 for pocket wheels 19 and 23 are constructed with the same number of recesses 50 as the corresponding pocket wheel has pockets 58. The recesses 50 are disposed on driver plate 49 and relative to the location of roller 51 circumferentially of the clutch disc 53 to effect a proper registry for successive bottles passing the pocket wheel and entering successive clamps on table 5.

Similarly, the safety clutch 310 driving cross shaft 21 has only a single notch 317 in the clutch plate to receive roller 316, since the speed of rotation for shaft 21 is such as to present a bottle clamp on table 5 for receiving a bottle from pocket wheel 19 for each revolution of the shaft, the ratio being approximately six revolutions of shaft 21 for each revolution of the pocket wheel.

The metering wheel 42 which is shown with eight bottle receiving recesses in its circumference should have a safety clutch with eight clutching positions and otherwise of similar construction to the safety clutches 46.

The actuation of valve 193 is constructed to make sure that the valve will never get out of phase with the machine. For this purpose the valve is mounted directly upon the stripper disc 126 and is driven by a cam from the lower gear box in order to actuate the valve during a dwell in the disc movement. The construction becomes particularly important where a throwout clutch is employed on shaft 251 between the disc 126 and the gears, as illustrated in connection with the metering wheel control described in the copending application referred to above on the metering mechanism.

Various embodiments of the invention may be employed within the scope of the accompanying claims which particularly point out and distinctly claim the subject matter regarded as the invention.

We claim:

1. A machine for applying tubular shrink-fit seals to bottle tops and the like, comprising bottle handling apparatus including a bottle conveyor, a rotary table adjacent the conveyor, means to sweep the bottles in succession from said conveyor, and onto said table, and means to clamp the bottles in index position as they travel with said table; and seal handling apparatus including a magazine seal supply having a pack of flat folded seals, means to strip the seals one by one from said magazine, rotary spear means disposed to enter the split end of the successive flat seals while the same are held by said stripping means, rotary means to pick up the seals in succession from said spear means and to transfer the same to a position above said table, and rotary means above said table concentric therewith and driven at the same speed as said table to receive seals in succession from said transfer means and complete the opening of the seals and index and apply the same to corresponding bottles traveling on said table.

2. The machine of claim 1 wherein means are provided to support said bottle handling apparatus and said seal handling apparatus as separate units at an adjusted height relative to each other to accommodate bottles of different height.

3. The machine of claim 1 wherein means are provided to support said seal handling apparatus at an adjusted height relative to the bottle handling apparatus to accommodate bottles of different height, and a drive is provided for the machine comprising a main drive for the bottle handling apparatus, drive means for the seal handling apparatus, and telescoping vertical splined shafts interconnecting the main drive with said seal handling drive means to actuate the latter in correlation to the former and to accommodate the height adjustment for the seal handling apparatus relative to the bottle handling apparatus.

4. The machine of claim 1 wherein the seal handling apparatus is supported on a plurality of laterally spaced vertical jacks and means are provided for actuating said jacks simultaneously to effect an adjustment in the height of said seal handling apparatus relative to said bottle handling apparatus and thereby accommodate different height bottles for different settings of the machine.

5. The machine of claim 1 wherein said magazine seal supply is disposed on the opposite side of said bottle conveyor from said table and generally at the height of the conveyor, the seal spear means lift the seals to a height above the level of the bottle tops, and the seal transfer means carry the seals across the conveyor to the applying means above the table.

6. The machine of claim 1 in which a common drive actuates both said bottle handling apparatus and said seal handling apparatus and comprises a main drive shaft extending generally parallel to and beneath the bottle conveyor, a motor driving said shaft, separate means driven by said shaft and driving said conveyor and said bottle sweeping means, respectively, a cross shaft driven by said main shaft, means connecting with said cross shaft at one end thereof for driving said bottle table and seal applying means, and means connecting with the cross shaft at the other end thereof for driving said seal stripping means, said seal spearing means and said seal transfer means.

7. The machine of claim 1 in which said magazine seal supply comprises a pair of laterally spaced parallel non-horizontal seal magazines disposed on the opposite side of said bottle conveyor from said rotary table and generally at the height of the table and having their lower discharge ends disposed in a common plane, said seal stripping means comprises a stripper disc disposed to support the seals in said magazines and mounted upon an oscillating shaft generally parallel to said magazines, and a pair of stripper blocks carried by said disc and spaced circumferentially on the face thereof a distance approximately one-half the circumferential spacing of said magazines thereon whereby said blocks register alternately with a corresponding magazine upon continued oscillating of the disc through a distance corresponding to the arcuate spacing of the blocks and alternately carrying successive seals from the corresponding magazines to a pick-off station on the disc at which said rotary spear means pick off successive seals, said rotary spear means lift the successive seals to a level just above the tops of the bottles on the conveyor and rotary table, and said rotary pick up means extend over said conveyor whereby the seals are transferred from the spear means to the rotary applying means above the table.

8. The machine of claim 1 in which said rotary pick-up means comprises a spider having a plurality of radially disposed shafts therein, a seal pick-up head carried by the outer end of each shaft and having operable finger means for entering and carrying successive seals from said spear means to said rotary seal opening and applying means, the fingers of said heads extending generally in a tangential direction and pointing forward during pick-up of a seal, means to rotate said spider, means to rotate said shafts in correlation to said spider rotation to reverse the direction of said fingers for delivery of the successive seals to said rotary seal opening and applying means, and means to hold said heads against rotation of said shafts at the pick-up and delivery locations.

9. The machine of claim 1 in which said bottle clamping means comprises a plurality of circumferentially spaced clamps each having a pair of pivotal arms carried by vertical shafts passing downwardly through the table, a crank at the lower end of each of said shafts, a pair of stationary generally circular cam tracks disposed beneath the table, and a cam follower on the end of each crank adapted to follow a corresponding cam track as said table rotates to effect actuation of said clamp arms in synchronism to the loading and discharge of bottles upon said table.

10. In a machine of the class described, seal supplying mechanism comprising a pair of laterally spaced parallel non-horizontal seal magazines having their lower discharge ends disposed in a common plane, a stripper disc disposed to support the seals in said magazines and mounted upon an oscillating shaft generally parallel to said magazines, a pair of stripper blocks carried by said disc and spaced circumferentially on the face thereof a distance approximately one-half the circumferential spacing of said magazines thereon whereby said blocks register alternately with a corresponding magazine upon continued oscillation of the disc through a distance corresponding to the arcuate spacing of the blocks and alternately carry successive seals from the corresponding magazines to a pick-off station on the disc, and spear means to enter and pick off successive seals at said pick-off station.

11. The construction of claim 10 in which the magazines are tilted downwardly toward the disc and have the central portion of the bottom seal support in each magazine cut away at the discharge end, the stripper blocks are narrow relative to the width of the seals and project forwardly from the face of the disc, a similarly narrow arcuate ridge is disposed on the face of the disc in line with the blocks to enter the recessed magazine ends and support the central portion of the end seals therein during oscillation of the disc while leaving the folded side edges of the seals free, and a metering tongue is adjustably disposed above the seals in each magazine at a predetermined distance from the face of the corresponding stripper block in excess of the thickness of the two walls of a flat folded seal at the center thereof and less than that of two seals having consideration for tolerances in seal thickness whereby only a single seal will be stripped from the end of each magazine at a time, said arcuate ridge on said disc being raised relative to the faces of said stripper block to substantially close the throat defined by said metering tongue as the disc oscillates to lift a seal on the face of the corresponding stripper block past said tongue.

12. The construction of claim 10 in which each seal is indexed relative to the corresponding spear entering the same at the pick-off station by locating the index slit edge of the seal into which the spear enters at a given position, and the magazines are located with respect to the pick-off station to provide an equal distance of travel for the corresponding index edge of each seal from its magazine to said pick-off station position therefor.

13. The construction of claim 10 in which each seal is indexed relative to the corresponding spear entering the same at the pick-off station by locating the index slit edge of the seal into which the spear enters at a given position, the magazines are located with respect to the pick-off station to provide an equal distance of travel for the corresponding index edge of each seal from its magazine to said pick-off station position therefor, and the magazine in which the edge of the seals toward the pick-off station constitute the index edge is adjustable in position relative to the pick-off station to accommodate seals of different length.

14. The construction of claim 10 in which the stripper blocks are disposed parallel to a cord of the circumference of the disc and each has an index end facing in the same circumferential direction and spaced approximately 90° apart, the index end which is at the bottom of the stripper block when the latter registers with its corresponding magazine being spaced downwardly from the horizontal centerline for the disc when at said registry location and parallel to said horizontal center line, the index end for the opposite stripper block being spaced above the horizontal centerline of the disc when the block registers with its corresponding magazine and parallel to said horizontal centerline, and each of said index ends being disposed approximately 90° from their said respective magazine registry positions when the corresponding stripper block is disposed at the pick-off station.

15. The construction of claim 10, and means to apply a suction to the face of the end seal in a magazine by the respective face of the corresponding stripper block registering therewith whereby the end seal is secured on the face of the stripper block for stripping the seal from the magazine, and means to release the suction on said seal at the pick-off station.

16. The construction of claim 10 and means to apply a suction to the face of the end seal in a magazine by the respective face of the corresponding stripper block registering therewith whereby the end seal is secured on the face of the stripper block for stripping the seal from the magazine, means to release the suction on said seal at the pick-off station, and means to apply a momentary blast of air to the seal at said pick-off station as the suction thereon is released.

17. The construction of claim 10 in which said stripper blocks are hollow and have ports in the face thereof for applying a suction to seals in registry with the blocks, and suction means are provided comprising a rotary valve body carried by the disc to oscillate therewith, passages from said valve body to said stripper blocks, a suction conduit leading to said valve body from a suction source, a valve member oscillatable with respect to said valve body to connect and disconnect the conduit alternately to passages leading to said stripper blocks, and means to actuate said valve member at the extreme position of oscillation of said disc in synchronism with said disc oscillation.

18. The construction of claim 10 and means to apply a suction to the face of the end seal in a magazine by the respective face of the corresponding stripper block registering therewith whereby the end seal is secured on the face of the stripper block for stripping the seal from the magazine, means to release the suction on said seal at the pick-off station, and means to apply a momentary blast of air to the seal at said pick-off station as the suction thereon is released, said suction and air blast means comprising a valve on the front of said disc, a suction conduit leading to said valve from a source of suction, a pressure conduit leading to said valve from a source of air pressure, a passage leading from said valve to each of said stripper blocks, and means to actuate said valve in correlation to the oscillation of said disc and valve.

19. In a machine of the class described, a stripper disc, means to oscillate said disc in its plane for delivery of successive seals to a pick-off station thereon near the circumference thereof, and a rotary spider having radial arms thereon with seal pick-off means on the end of each arm, said spider being disposed to present a seal pick-off means at said pick-off station for each seal delivered to said station by said disc, the rotary path for said pick-off means on said spider being in a plane at an angle to the plane of said disc assisting in the lifting of each successive seal away from the face of the disc as the seal is picked off therefrom by a corresponding pick-off means.

20. The construction of claim 19 in which the axis for the spider is above that for the stripper disc and is offset in the vertical plane approximately 10° from the axis of the stripper disc.

21. The construction of claim 19 in which the axis for the stripper disc is disposed at an angle to the horizontal with the stripper disc facing angularly upward in a plane substantially normal to the axis, the axis for the pick-off spider is above the first named axis and disposed at an angle to the horizontal approximately one-half the angle of said first named axis, and said pick-off means are disposed at an angle to a plane normal to said spider axis to dispose the same in substantial registry with a seal flat on the face of said stripper disc at the pick-off station and with the seal in a substantially vertical plane when delivered to a pick-up station at the top of the circular path for said pick-off means on said spider.

22. The construction of claim 19 in which the circular path for said pick-off means overlaps the face of said stripper disc substantially only at said pick-off station, and the latter is disposed at the top of the disc, the axis for said disc is at an angle of the order of 20° to the horizontal, the axis for said spider is above said first named axis and is disposed at an angle of the order of 10° to the horizontal, and said axes are disposed at an angle of the order of 1° when projected to a horizontal plane whereby said pick-off means more readily lift the successive seals from the face of said stripper disc.

23. The construction of claim 19 in which each said pick-off means comprises a spear pointing in the general direction of travel thereof and adapted to enter the split edge of a flat folded seal at the pick-off station, and a clamp actuated automatically in synchronism with the rotation of said spider to secure a seal on said spear.

24. In a machine of the class described having seal handling apparatus including a seal transfer mechanism for picking up successive partially open seals at a pick-up station and delivering the same at a transfer station to a seal applying mechanism for completing the opening of the successive seals and applying the same to successive bottle tops, a seal transfer mechanism comprising a rotary spider on a vertical axis, a seal transfer head carried by said spider and having at least one pair of parallel fingers disposed in substantially a vertical plane for entering a seal at the pick-up station, at least one of the fingers of said pair being mounted on the free end of a pivotal arm having its pivotal axis parallel to said fingers, means biasing said pivotal arm in a direction to separate said fingers, means to limit the separation of said fingers in response to said biasing means when no seal is on the fingers, the separation of said fingers being otherwise limited by a seal thereon, cam means at said pick-up station adapted to move said pivotal arm against said biasing means and partially close said fingers as the same enter a seal at said pick-up station, said cam terminating as soon as full entry is made of the fingers into the seal to effect separation of the fingers and stretching of the seal thereon, and cam means at said transfer station adapted to move said pivotal arm against said biasing means to loosen the seal thereon and facilitate transfer of the seal to said applying mechanism as said transfer spider rotates.

25. The construction of claim 24 in which the seal is delivered to said transfer head by a spear carrying the seal, and the fingers of said pair of fingers straddle the spear in picking up the seal therefrom.

26. The construction of claim 24 in which the seal is delivered to said transfer head by a spear carrying the seal, the fingers of said pair of fingers straddle the spear in picking up the seal therefrom, and said spear is moved in a circular path generally tangential to the circular path of said transfer head, the overlap of said paths being at said pick-up station where the spear and said fingers point in the same direction and said spear is made to dwell in its movement as the seal is stripped therefrom by the fingers of said transfer head.

27. The construction of claim 24 in which a plurality of transfer heads are carried by said spider and each said transfer head is mounted on a rotary shaft extending radially of said spider, means are provided to rotate said shaft and head in synchronism with the rotation of said spider whereby the fingers point forwardly in the direction of travel of said head on said spider at said pick-up station and the fingers point rearwardly in the direction of travel of said head on said spider at said transfer station, and crank means are provided to effect a dwell in the rotation of said shaft and thereby secure the fingers against displacement as they pass the pick-up station and the transfer station.

28. In combination in a machine of the class described for applying closures to bottles and the like, a bottle handling apparatus including a bottle conveyor, a rotary table adjacent the conveyor and having clamps thereon for locating successive bottles around the same, a pocket wheel disposed to sweep the bottles in succession from the intake end of said conveyor and onto said table, a pocket wheel to sweep the bottles in succession from said table and onto the discharge end of said conveyor, a metering wheel adjacent the intake pocket wheel to space the bottles as they pass down the conveyor toward the pocket wheel; closure handling apparatus including a magazine supply of closures, means to receive successive closures from said magazine supply and to transfer the same to a position above said table, and closure applying means above said table and indexed with the clamped bottles thereon to apply successive closures to corresponding bottles; and a drive for said apparatus comprising an electric motor, a main drive shaft driven by said motor and extending generally longitudinal of and beneath said conveyor, individual worm gears on said shaft connected to drive the corresponding metering wheel, pocket wheels, table, and closure handling apparatus, and safety clutches individually disposed between the corresponding worm gears and the respective parts of the machine driven thereby for disconnecting the corresponding drive in case of overload indicating bottle breakage.

29. The combination of claim 28 in which each safety clutch is additionally constructed to open the motor circuit simultaneously with an opening of the clutch.

30. The combination of claim 28 in which the motor circuit includes a holding relay and each safety clutch is additionally constructed to open the holding circuit for said relay simultaneously with an opening of the clutch whereby said motor is stopped and will not restart until the holding circuit is re-set by the operator.

References Cited in the file of this patent

UNITED STATES PATENTS

| | | |
|---|---|---|
| 1,309,935 | Calleson | July 15, 1919 |
| 2,241,455 | Gantzer | May 13, 1941 |
| 2,371,748 | Fedorchak | Mar. 20, 1945 |
| 2,507,186 | Schneider | May 9, 1950 |
| 2,623,673 | Holstein | Dec. 30, 1952 |
| 2,630,260 | Tracy et al. | Mar. 3, 1953 |
| 2,652,963 | Pomeroy | Sept. 22, 1953 |